United States Patent
Oota et al.

(10) Patent No.: US 7,513,524 B2
(45) Date of Patent: Apr. 7, 2009

(54) VEHICLE OCCUPANT RESTRAINT SYSTEM AND METHOD

(75) Inventors: Kouichi Oota, Yamato (JP); Hideo Tobata, Yokosuka (JP); Daisuke Masuda, Zama (JP); Gousuke Wakana, Isehara (JP); Tetsuo Maki, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 224 days.

(21) Appl. No.: 11/199,223

(22) Filed: Aug. 9, 2005

(65) Prior Publication Data

US 2006/0028004 A1 Feb. 9, 2006

(30) Foreign Application Priority Data

| Aug. 9, 2004 | (JP) | 2004-232428 |
| Aug. 9, 2004 | (JP) | 2004-232433 |
| Sep. 9, 2004 | (JP) | 2004-262168 |

(51) Int. Cl.
B60R 21/18 (2006.01)

(52) U.S. Cl. ................................. 280/733

(58) Field of Classification Search ............... 280/729, 280/733, 743.1, 730.1
See application file for complete search history.

(56) References Cited

U.S. PATENT DOCUMENTS

| 2,834,606 A | * | 5/1958 | Bertrand .............. 280/730.1 |
| 3,430,979 A | * | 3/1969 | Terry et al. ............ 280/733 |
| 3,642,303 A | * | 2/1972 | Irish et al. ............ 280/730.1 |
| 4,290,627 A | * | 9/1981 | Cumming et al. ........ 280/729 |
| 5,062,662 A | * | 11/1991 | Cameron .............. 280/733 |
| 5,310,214 A | * | 5/1994 | Cuevas ................ 280/729 |
| 5,577,765 A | * | 11/1996 | Takeda et al. .......... 280/729 |
| 5,642,902 A | * | 7/1997 | France ................ 280/737 |
| 5,959,552 A | * | 9/1999 | Cho .................. 340/903 |
| 6,308,983 B1 | * | 10/2001 | Sinnhuber ............ 280/735 |
| 6,378,898 B1 | * | 4/2002 | Lewis et al. .......... 280/733 |
| 6,536,800 B2 | * | 3/2003 | Kumagai et al. ........ 280/743.1 |
| 6,786,505 B2 | * | 9/2004 | Yoshida .............. 280/729 |
| 6,851,706 B2 | * | 2/2005 | Roberts et al. ......... 280/730.1 |
| 6,971,664 B2 | * | 12/2005 | Amamori ............. 280/729 |
| 2003/0030254 A1 | * | 2/2003 | Hasebe ............... 280/729 |
| 2004/0012179 A1 | * | 1/2004 | Pinsenschaum et al. ... 280/739 |
| 2004/0026904 A1 | * | 2/2004 | Yamazaki et al. ....... 280/730.1 |

FOREIGN PATENT DOCUMENTS

| DE | 198 60 823 A1 | 7/2000 |
| EP | 1 279 565 A1 | 1/2003 |
| JP | 07-186861 A | 7/1995 |
| JP | 10-071911 A | 3/1998 |

* cited by examiner

Primary Examiner—John Q. Nguyen
Assistant Examiner—Joseph Rocca
(74) Attorney, Agent, or Firm—Foley & Lardner LLP

(57) ABSTRACT

A vehicle occupant restraint system is provided with an air bag restraint device including a first deploying portion deploying between a vehicle occupant and a portion in a vehicle, and a second deploying portion deploying related to the first deploying portion. The second deploying portion providing a support for the first deploying portion to receive at least a part of a load acting on the first deploying portion from a head of the vehicle occupant.

33 Claims, 25 Drawing Sheets

VEHICLE OCCUPANT RESTRAINT SYSTEM AND METHOD

BACKGROUND OF THE INVENTION

The present invention relates to a vehicle occupant restraint system, and particularly to a vehicle occupant restraint system including a seat belt restraint device and an air bag restraint device.

Japanese Patent Application Laid-Open Publication 7-186861 discloses a seat belt restraint device combined with an air bag restraint device having an air bag stored in a shoulder belt portion of a seat belt.

SUMMARY OF THE INVENTION

However, upon the study conducted by the present inventors, in such a structure, the shoulder belt portion extends across the upper torso of a seated occupant, and the air bag inflates and extends forwardly in a direction toward a steering wheel during the process of deployment, with the steering wheel supports the air bag to maintain it in a predetermined position.

That is, concerning several requirements of the increase of volume, the sustainment of internal pressure and the reduction of inflation time, such a belt stored-type air bag is submitted to substantially the same situation as those of general steering wheel stored-type air bags for ensuring a protective effect of the belt stored air bag, with the same limitation in energy absorption.

One object of the present invention is to provide a vehicle occupant restraint system and method in which a vehicle occupant can be restrained at short times with a wider restraint range by use of an air bag, so as to increase energy absorption in case of a vehicle collision.

Another object of the present invention is to provide a vehicle occupant restraint system and method in which an air bag can be secondarily deployed by use of an increase of internal pressure, to be generated in the air bag in case of a vehicle collision, for restraining another portion of a vehicle occupant, so as to increase energy absorption.

Another object of the present invention is to provide a vehicle occupant restraint system and method which a head protection air bag is pressed by a leg protection air bag in case of a vehicle collision, while hastening a restraint of the head protection air bag, so as to increase energy absorption.

In order to achieve the aforementioned object, in one aspect of the present invention, there is provided a vehicle occupant restraint system, comprising: an air bag restraint device including a first deploying portion deploying between a vehicle occupant and a portion in a vehicle, and a second deploying portion deploying concurrently with the first deploying portion in contact therewith, whereby the second deploying portion providing a support for the first deploying portion to receive at least a part of a load acting on the first deploying portion from a head of the vehicle occupant.

In other words, in another aspect of the present invention, there is provided a vehicle occupant restraint system, comprising: an air bag restraint device including first deploying means for deploying between a vehicle occupant and a portion in a vehicle, and second deploying means for deploying concurrently with the first deploying means in contact therewith, whereby the second deploying means providing a support for the first deploying means to receive at lease a part of a load acting on the first deploying means from a head of the vehicle occupant.

Besides, in another aspect of the present invention, there is provided a vehicle occupant restraint method, comprising: deploying an air bag of an air bag restraint device between a vehicle occupant and a portion in a vehicle and also between a head of a vehicle occupant and on femoral regions of the vehicle occupant in case of a vehicle frontal collision, thereby receiving the head of the vehicle occupant; and supporting a load acting on the femoral regions of the vehicle occupant via the air bag from the head of the occupant.

Other and further features, advantages, and benefits of the present invention will become more apparent from the following description taken in conjunction with the following drawings.

DETAILED DESCRIPTION OF THE INVENTION

Figure 1:
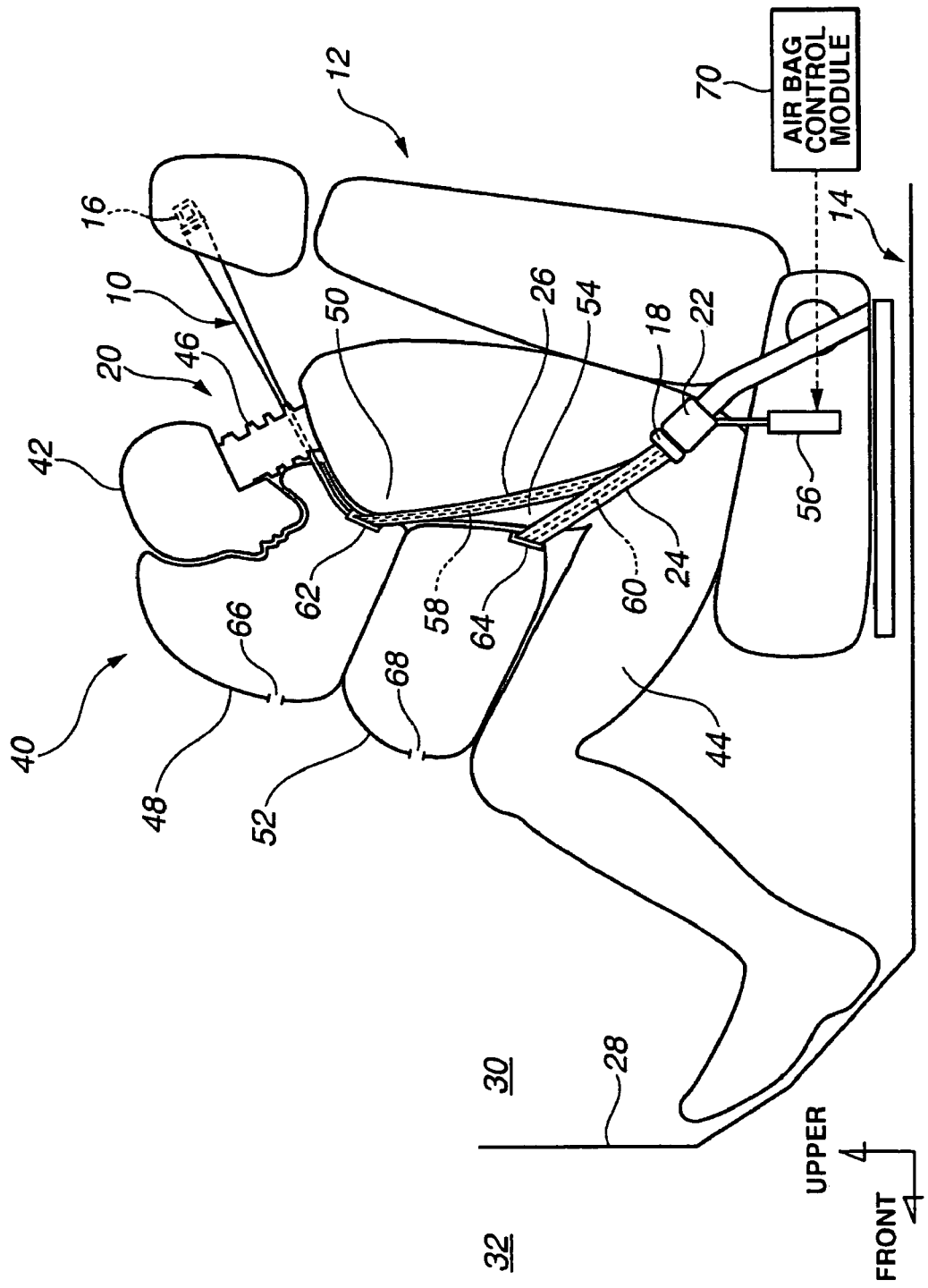
FIG. 1 shows a first embodiment of a vehicle occupant restraint system in a motor vehicle, according to the present invention.

The accompanying drawings illustrate various exemplary embodiments of a vehicle occupant restraint system and method according to the present invention. Incidentally, hereinafter, like reference numerals are used throughout each drawing to designate like parts or portions. Also, in each embodiment, a vehicle occupant representatively corresponds to a dummy model having a dimension ranging from a 5 percentile female to 95 percentile male.

First Embodiment

FIG. 1 shows a vehicle occupant restraint system for a driver or a passenger of a motor vehicle in an activated condition. In FIG. 1, the reference numeral 10 generally denotes a three-point seat belt restraint device. The three-point seat belt restraint device 10 includes a single belt. One end of the belt is mounted to a retractor, while the other end is anchored to a seat 12 or a vehicle body 14 of the motor vehicle or mounted to another retractor. The seat belt extends through a shoulder through ring 16 anchored to an upper portion of the vehicle body 14, for example, an upper portion of a center pillar. A seat belt tongue 18 is connected to the belt intermediate to the belt ends. The tongue 18 may be swung across a vehicle occupant 20 and engaged with a buckle 22 fixed to the seat 12, thereby positioning a lap belt portion 24 of the belt across the lap and a shoulder belt portion 26 of the belt across the upper torso.

The seat 12 may be a front seat, such as a driver-side seat or a passenger-side seat. In front of the seat 12, there is a dash panel 28. The dash panel 28 separates a passenger compartment 30 from an engine compartment 32.

In FIG. 1, the reference numeral 40 generally denotes an air bag restraint device accommodated in the belt of the seat belt restraint device 10. In the illustrated embodiment, the air bag restraint device 40 was accommodated in and has deployed out of the lap and shoulder belt portions 24 and 26. The deployed air bag restraint device 40 extends between the head 42 of the vehicle occupant 20 and the femoral regions 44 thereof. At a lower end portion, the deployed air bag restraint device 40 directly rests against the femoral regions 44. At an upper end portion, the deployed air bag restraint device 40 receives the head 42 of the vehicle occupant 20 when the head 42 swings forwardly during a frontal collision of the vehicle. The deployed air bag restraint device 40, which directly rests against the femoral regions 44, indirectly supports the head 42 at the femoral regions 44 during the vehicle frontal collision. The deployed air bag restraint device 40 can minimize acceleration acting on a neck 46 of the vehicle occupant 20 by optimizing transmission of the load acting on the upper or head protection air bag 48 by the head 42 to the femoral regions 44.

As mentioned before, the deployed air bag restraint device 40 extends over the upper torso of the vehicle occupant 20 in a vertical direction. In the illustrated embodiment of FIG. 1, the deployed air bag restraint device 40 comprises a plurality of separate air bags arranged in the vertical direction in a manner to transmit the applied load by the head 42 to the femoral regions 44 one after another.

A first or upper air bag 48 for directly protecting the head 42 of the vehicle occupant 20 has deployed out of the shoulder belt portion 26. A second or lower air bag 52, which has deployed out of the lap belt portion 24, extends over the femoral regions 44 for also protecting the head 42 of the vehicle occupant 20 by cooperating with the upper air bag 48. The lower air bag 52, which directly rests against the femoral regions 44, indirectly supports the head protection air bag 48 at the femoral regions 44, so that the head protection air bag 48 is held in its predetermined position in the extreme proximity of the head 42 of the vehicle occupant 20.

The air bags 48 and 52 may be made of any suitable material for an occupant restraint air bag, such as a plastic film lacking ventilation and elasticity. The upper or head protection air bag 48 was folded and accommodated in the shoulder belt portion 26 at an area facing the thorax 50 of the vehicle occupant 20. The lower air bag 50 was folded and accommodated in the lap belt portion 24 at an area facing the abdomen 54 of the vehicle occupant 20. Preferably, the deployed upper and lower air bags 48 and 52 extend equally in the opposite lateral directions away from the vertical plane bisecting the vehicle occupant 20.

In the illustrated embodiment, the upper and lower air bags 48 and 52 are inflated upon supply of pressurized gas from a common gas supply system. The common gas supply system includes a single gas generator or inflator 56, a first gas tube 58 for the upper or head protection air bag 48 and a second gas tube 60 for the lower air bag 52. At one end, the first gas tube 58, which extends through the shoulder belt portion 26, communicates with the upper air bag 48 via a deployment section 62. At one end, the second gas tube 60, which extends through the lap belt portion 24, communicates with the lower air bag 52 via a deployment section 64.

At the other end, the first gas tube 58 communicates with the interior of the seat belt tongue 18. At the other end, the second gas tube 60 communicates with the interior of the seat belt tongue 18. The interior of the seat belt tongue 18 is brought into communication with an interior of the buckle 22 when the seat belt tongue 18 is inserted into and engaged with the buckle 22. The interior of the buckle 22 communicates with the inflator 56. Pressurized gas generated by the inflator 56 is supplied to the first and second gas tubes 58 and 60 via the buckle 22 and seat belt tongue 18. Via the first and second gas tubes 58 and 60, the pressurized gas is supplied to the upper and lower air bags 48 and 52.

The upper and lower air bags 48 and 52, which inflate due to the pressurized gas supplied thereto, have vent holes 66 and 68, respectively. The function of the vent hole 66 is to release an excess gas thereby preventing internal pressure within the upper air bag 48 from exceeding a predetermined pressure value during the process of deployment and after deployment. The function of the vent hole 68 is to release an excess gas thereby preventing internal pressure within the lower air bag 52 from exceeding a predetermined pressure value during the process of deployment and after deployment.

Generation of pressurized gas begins upon or immediately after activation of the inflator 56 triggered by a command signal from an air bag control module 70. In the illustrated embodiment, the air bag control module 70 can determine that a frontal collision of the vehicle is imminent and generate the command signal immediately before the vehicle frontal collision. As the upper and lower air bags 48 and 52 start inflating in response to the command signal, the upper and lower air bags 48 and 52 will complete their deployment at an early timing immediately before or during the process of the vehicle frontal collision.

According to a method aspect of the illustrated embodiment, a vehicle occupant restraint method comprises deploying the upper and lower air bags 48 and 82 out of the shoulder and lap belt portions 26 and 24 to extend between the head 42 of the vehicle occupant 20 and the femoral regions 44 of the vehicle occupant 20; receiving the head 42 of the vehicle occupant 20 by the upper air bag 48 during a frontal collision of the vehicle; and supporting the head 42 of the vehicle occupant 20 at the femoral regions 44 via the upper and lower air bags 48 and 52 during the vehicle frontal collision.

Upon determination that a frontal collision of the vehicle is imminent, the air bag control module 70 provides a command signal to the inflator 56 thereby activating the inflator 56. The inflator 56, when activated, generates pressurized gas. The pressurized gas flows into the upper and lower air bags 48 and 52 via the buckle 22, tongue 18, and gas tubes 58 and 60.

Figure 2:
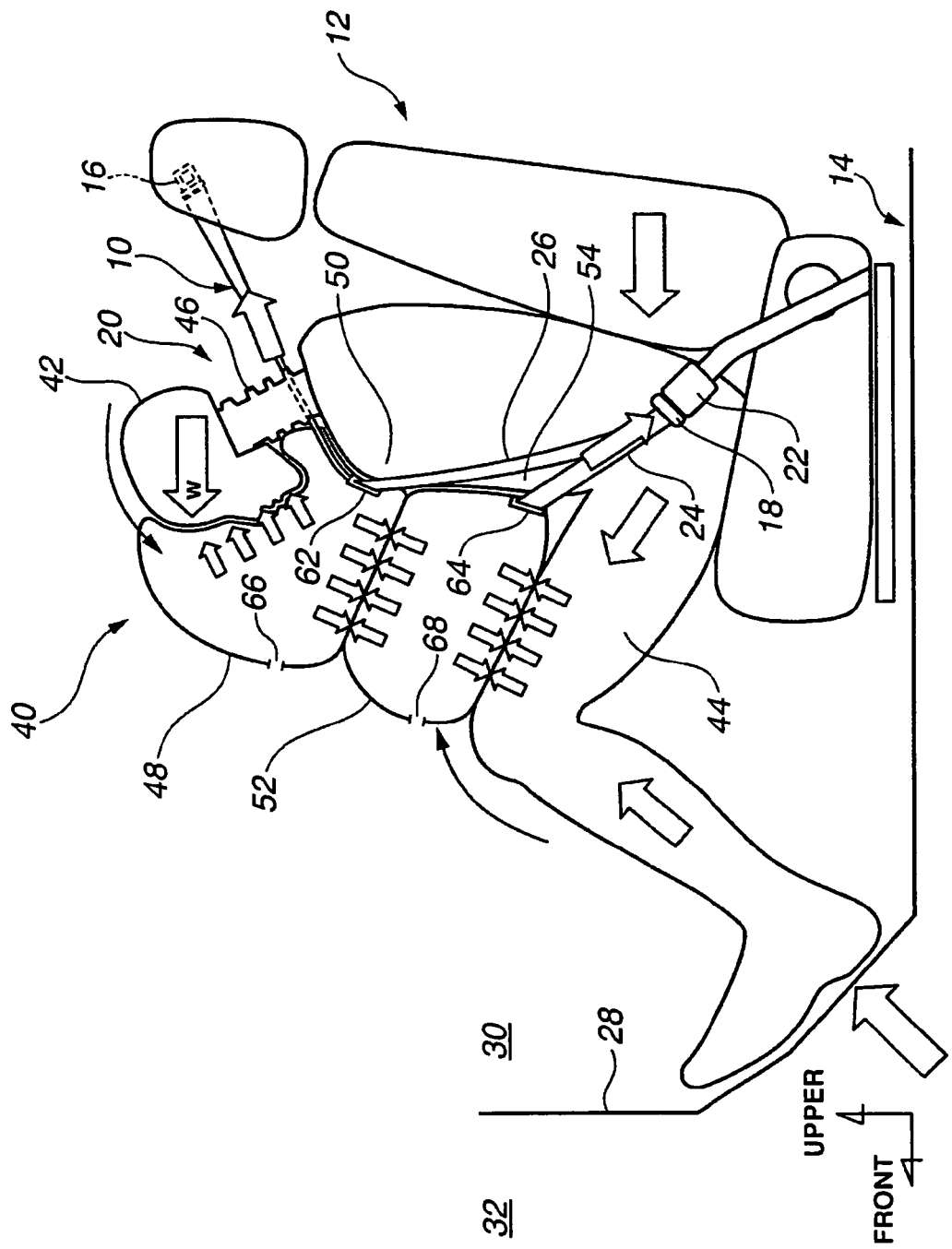
FIG. 2 shows how the presently filed embodiment of FIG. 1 works during a vehicle frontal collision.

Referring also to FIG. 2, the illustrated arrows indicate forces, including inertia, reaction and gas pressure, acting on the vehicle occupant 20 restrained by the vehicle occupant restraint system of FIG. 1 in the activated condition during a frontal collision of the vehicle. Because the seat belt restraint device 10 restrains the upper torso of the vehicle occupant 20 to the seat 12, the head 42 of the vehicle occupant 20 swings forwardly to come into interference with the upper air bag 48.

Because the upper and lower air bags 48 and 52 have deployed quickly out of the shoulder and lap belt portions 26 and 24 in the order of milliseconds, the deployed upper air bag 48 extends in the extreme proximity of the head 42 of the vehicle occupant 20 before the head 42 of the vehicle occupant 20 swings forwardly, due to the inertia, during a frontal collision of the vehicle. Besides, the seat belt restraint device 10 restricts the vehicle occupant 20 thereby ensuring that, during the frontal collision of the vehicle, the head 42 of the vehicle occupant 20 comes into interference with the upper air bag 48 immediately after the upper air bag 48 has deployed.

Figure 3:
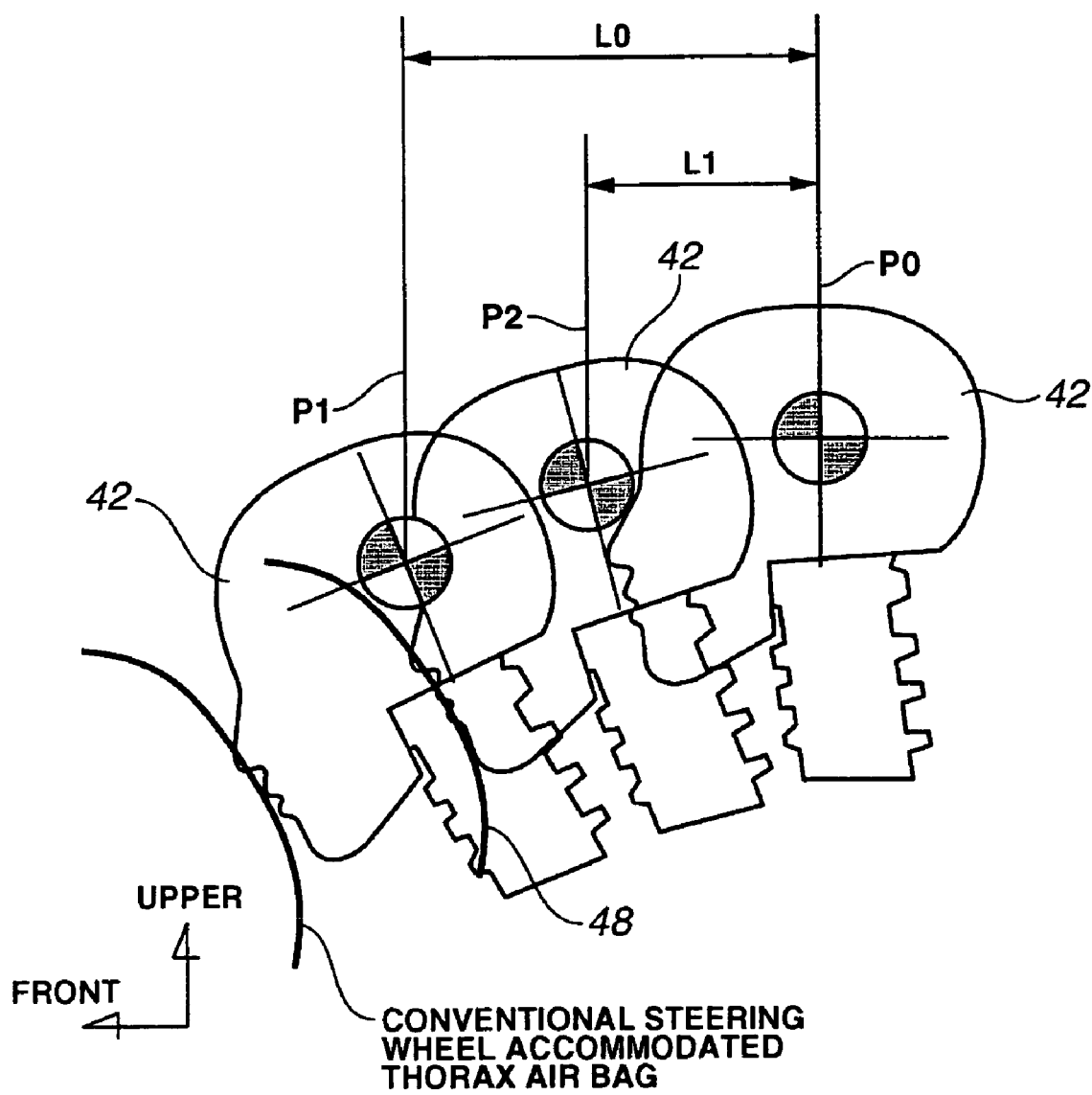
FIG. 3 shows movement of the head during the vehicle frontal collision until the head comes into interference with a head protection air bag of the presently filed embodiment of FIG. 1 as compared to movement of the head until it comes into interference with a conventional steering wheel accommodated thorax air bag.

Referring also to FIG. 3, the reference character P0 indicates the normal position of the head 42 of the vehicle occupant 20. The reference character P1 indicates a position at which the head 42 comes into interference with the deployed conventional steering wheel accommodated thorax air bag after the head 42 has swung forwardly during a vehicle frontal collision. The reference character P2 indicates a position at which the head 42 comes into interference with the deployed upper or head protection air bag 48 after the head 42 has swung forwardly during a vehicle frontal collision. As mentioned before, the deployed upper air bag 48 is closer to the head 42 than the conventional steering wheel accommodated air bag is. The embodiment of FIG. 1 allows the head 42 to swing freely till contact with the deployed upper air bag 48 through a distance L1. This distance L1 is less than a distance L0 through which the head 42 moves freely till contact with the deployed conventional steering wheel accommodated air bag. It will be appreciated as an advantage that the embodiment of FIG. 1 provides a reduction in distance through which the head 42 of the vehicle occupant 20 moves freely during the process of the vehicle frontal collision.

Figure 4:
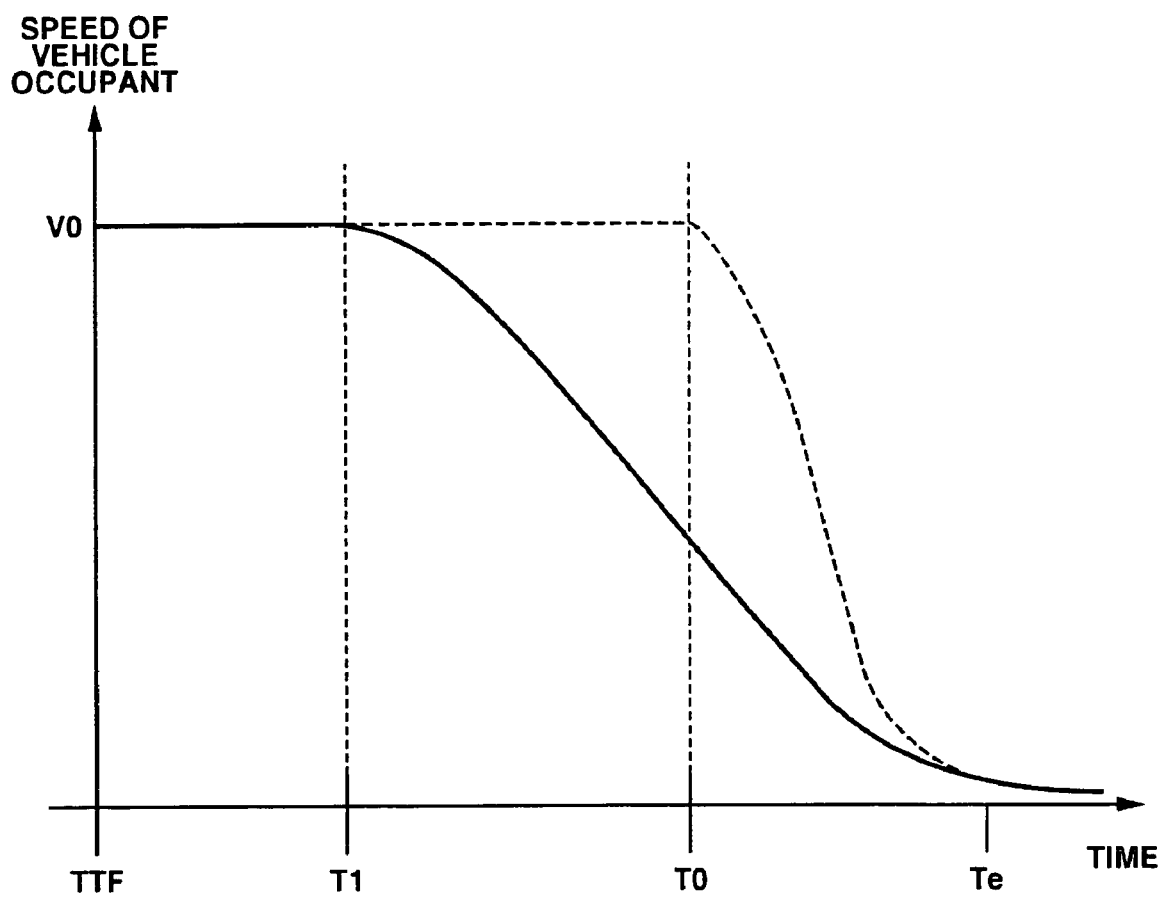
FIG. 4 shows the occupant's head speed vs. time characteristic curve according to the presently filed embodiment of FIG. 1 as compared to the characteristic curve according to the conventional steering wheel accommodated thorax air bag.

Referring now to FIG. 4, the vertical axis represents speed at which the head 42 of the vehicle occupant 20 is subject to during the process of a vehicle frontal collision, and the horizontal axis represents time elapsed from the initiation of the process of the vehicle frontal collision. TTF represents the moment at which the process of the vehicle frontal collision starts. V0 represents an initial speed which the vehicle occupant 20 is subject to at the moment TTF. The illustrated fully drawn curve indicates varying of speed with time according to the embodiment of FIG. 1. The broken line drawn curve indicates varying of speed with time according to the conventional steering wheel accommodated thorax air bag. As the distance L1 is less than the distance L0 (see FIG. 3), a period of time T1 for free movement of the head 42 till interference with the deployed upper air bag 48 is shorter than a period of time T0 for free movement of the head 42 till interference with the deployed conventional steering wheel accommodated air bag. The period of time T1 may be expressed as L1/T0, while the period of time T0 may be expressed as L0/V0. It will be appreciated as an advantage that the embodiment of FIG. 1 provides a reduction in period of time for free movement of the head 42 during the process of a vehicle frontal collision.

In FIG. 4, deceleration of the head 42 starts at the moment T1 according to the embodiment of FIG. 1. This moment T1 is earlier than the moment T0 at which deceleration of the head 42 starts according to the conventional steering wheel accommodated air bag. The reference character Te represents the moment at which the process of the vehicle frontal collision ends and the head speed drops to zero. The fully drawn curve shows that deceleration of the head 42 starts at the moment T1 and ends at the moment Te. The broken line curve shows that deceleration of the head 42 starts at the moment T0 and ends at the moment Te. As compared to the conventional steering wheel accommodated air bag, the embodiment of FIG. 1 provides for a longer period of time for bringing the speed of the head 42 from the speed of V0 to zero. The deceleration acting on the neck is considerably reduced during a vehicle frontal collision. This provides for a significant reduction of the load acting on the cervical spine.

The embodiment of FIG. 1 provides for an increase in area through which the head 42 interferes with the upper air bag 48 because of the increased period of time T1-Te. This provides for a better distribution of reaction acting on the head 42 so that the vehicle occupant 20 has a reduced risk of injury on the face during the vehicle frontal collision.

As shown in FIG. 2, the load W from the head 42 acts on the upper air bag 48 after the lower air bag 52 has rested against the femoral regions 44 of the vehicle occupant 20. The upper and lower air bags 48 and 52 support the head 42 of the vehicle occupant 20 against the femoral regions 44 by transmitting the load W acting on the upper air bag 48 toward the femoral regions 44 via the lower air bag 52.

In the embodiment of FIG. 1, the upper air bag 48 catches the head 42 immediately after the head 42 tends to swing forwardly, and then the femoral regions 44 of the vehicle occupant 20 bear the load W acting on the upper air bag 48 via the lower air bag 52. This provides for a significant reduction in time required for the air bag restraint device 40 to restrain the head 42.

In the embodiment of FIG. 1, the air bag restraint device 40 extends to restrain the vehicle occupant 20 over an increased restraint range from the head 42 of the vehicle occupant 20 down to the femoral regions 44 in its deployed condition. Through this increased restraint range, the kinetic energy of the vehicle occupant 20 is absorbed. This provides for a significant increase in absorption amount of the kinetic energy of the vehicle occupant 20 thereby providing enhanced protection against injuries of the vehicle occupant 20.

Referring again to FIG. 2, the knees of the vehicle occupant 20 are pressed from below during a vehicle frontal collision in an accident condition where the dash panel 28 moves into the passenger compartment 30. The load acting on the knees is reduced by the lower air bag 52 resting against the femoral regions 44. This provides for a damper to protect injuries of the legs of the vehicle occupant 20.

In the embodiment of FIG. 1, the air bag restraint device 40, in interference with the head 42 of the vehicle occupant 20, presses the femoral regions 44 of the vehicle occupant 20 from above during a vehicle frontal collision. This prevents the waist of the vehicle occupant 20 from moving forwardly out of the restraint of the lap belt portion 24.

In the embodiment of FIG. 1, the upper and lower air bags 48 and 52 can alleviate an impact upon the head 42 of the vehicle occupant 20 during a vehicle frontal collision by keeping reaction to an input from the head 42 constant because the vent holes 66 and 68 suppress an increase in internal pressure of each of the upper and lower air bags 48 and 52, which tends to occur due to the input from the head 42, by discharging an excess gas out of the air bag. This provides for a sufficient restraint of the vehicle occupant 20 without increasing the impact.

In the embodiment of FIG. 1, the air bag restraint device 40 employs the plurality of vertically arranged separate air bags 48 and 62. The arrangement of the plurality of air bags to fill up an area between the head 42 and the femoral regions 44 is advantageous over the arrangement of a single air bag in that an air bag of reduced volume may be used. The use of air bags of reduced volume provide for a reduction of inflation time as compared to the single air bag.

In the embodiment of FIG. 1, the upper or head protection air bag 48 deploys in the extreme proximity of the head 42 of the vehicle occupant 20 and the lower air bag 52 deploys under the upper or head protection air bag 48 to directly rest against the femoral regions 44 of the vehicle occupant 20. An air bag of reduced volume may be used as the upper or head protection air bag 48. The use of an air bag of reduced volume provides for a reduced risk of injury of the vehicle occupant 20 during the process of deployment, so that the head protection air bag is allowed to deploy in the extreme proximity of the head 42 of the vehicle occupant 20 as compared to the conventional thorax air bags deploying out of a steering wheel. The lower air bag 52, which directly rests against the femoral regions 44 of the vehicle occupant 20, indirectly supports the upper or head protection air bag 48 against the femoral regions 44 thereby keeping the upper or head protection air bag 48 in its predetermined position in the extreme proximity of the head 42 of the vehicle occupant 20. The upper or head protection air bag 48 receives the load W (see FIG. 2) acting thereon from the head 42 and the lower air bag 52 indirectly supports the load W acting on the upper or head protection air bag 48 against the femoral regions 44 of the vehicle occupant 20. This provides for an increased efficiency of transmission of the load W to the femoral regions 44 without increasing volume of each air bag.

In addition, according to the embodiment of FIG. 1, the air bag restraint device 40 deploys at an early timing immediately before or during the process of a vehicle frontal collision because a command signal is generated upon determining that the vehicle frontal collision is imminent. This allows the upper or head protection air bag 48 to restrain the head 42 at an early timing thereby increasing the protective effect by reducing an impact upon the vehicle occupant 20.

In the embodiment FIG. 1, the upper and lower air bags 48 and 52 are accommodated in the shoulder and lap belt portions 26 and 24, respectively, and connected, via the respective deployment sections 62 and 64, to the different gas tubes 58 and 60 of the common gas supply system. The lower air bag 52 serves as a support for the upper or head protection air bag 48 in the predetermined position in the extreme proximity of the head 42 of the vehicle occupant 20 during a vehicle frontal collision. The lap belt 24 ensures that the lower air bag 52 deploys and directly rests against the femoral region 44 of the vehicle occupant 20 to maintain the upper or head protection air bag 48 in the predetermined position.

The embodiment of FIG. 1 may be simplified by using an air bag restraint device including a lower air bag formed as an integral part of an upper or head protection air bag. Due to the integration of the lower air bag, the upper and lower air bags can be accommodated in the shoulder belt portion 26. The lap belt portion 24 no longer has a function to ensure that the integral lower air bag deploys and directly rests against the femoral region 44 of the vehicle occupant 20 to maintain the upper or head protection air bag in the predetermined position in the extreme proximity of the head 42 of the vehicle occupant 20. A need remains for ensuring that the integral lower air bag deploys toward the femoral regions 44 of the vehicle occupant 20 to directly rest against the femoral regions 44 to maintain the upper or head protection air bag in the predetermined position in the extreme proximity of the head 42 of the vehicle occupant 20. An air bag restraint device to meet the need is described below in connection with FIG. 5.

Second Embodiment

Figure 5:
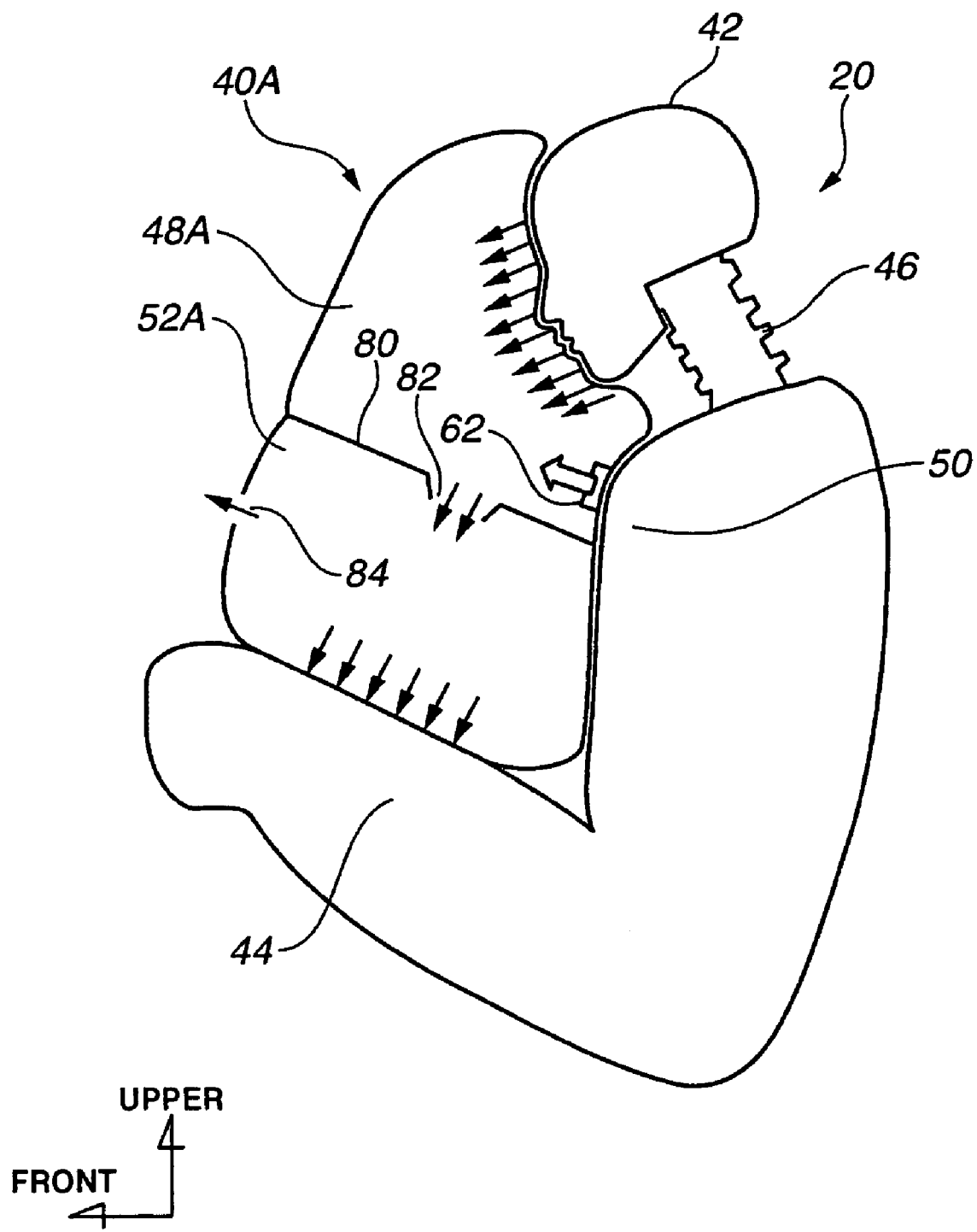
FIG. 5 shows a second embodiment of a vehicle occupant restraint system in a motor vehicle, according to the present invention.

FIG. 5 is a simplified illustration of a portion of an air bag restraint device 40A of another embodiment of a vehicle occupant restraint system. This embodiment is substantially the same as the embodiment of FIG. 1 in that a three-point seat belt restraint device 10, which restrains a vehicle occupant 20, includes a shoulder belt portion 26 accommodating an upper or head protection air bag of an air bag restraint device, and in that the upper or head protection air bag inflates and deploys when supplied with gas pressure from a gas supply system via a deployment section.

However, the embodiment of FIG. 5 is different from the embodiment of FIG. 1 in the supply of gas pressure to a lower air bag of the air bag restraint device in timing and in flow path. In addition, the embodiment of FIG. 5 is different from the embodiment of FIG. 1 in the manner of deploying the lower air bag to ensure its function of serving as a support for the upper or head protection air bag.

In the embodiment of FIG. 1, the lower air bag 52 and the upper or head protection air bag 48 inflated at the same timing, and gas under pressure is directly supplied to the lower air bag 52 from the second gas tube 60 of the gas supply system via the second deployment section 64. In contrast, in the embodiment of FIG. 5, a lower air bag 52A inflates after an upper or head protection air bag 48A has inflated and deployed, and gas under pressure is not directly supplied to the lower air bag 52A from a gas supply system but indirectly supplied thereto via the upper or head protection air bag 48A. As seen from FIG. 5, a portion of gas within the upper or head protection air bag 48A is allowed to flow into the lower air bag 52A via a one-way check valve 82 provided in a partition 80 between the upper and lower air bags 48A and 52A. In the embodiment of FIG. 1, in order to ensure its function of serving as a support for the upper or head protection air bag 48, the lower air bag 52 deployed out of the lap belt portion 24 to rest against the femoral regions 44 of the vehicle occupant 20. The deployed lower air bag 52 was kept on resting against the femoral regions 44 of the vehicle occupant 20 under the restraint of the lap belt portion 24. In contrast, in the embodiment of FIG. 5, in order to ensure its function of serving as a support for the upper or head protection air bag 48A, the lower air bag 52A has deployed out of the deployed upper or head protection air bag 48A in a direction toward the femoral regions 44 of the vehicle occupant 20 to rest against same. The partition 80 is kept in a predetermined position by the upper or head protection air bag 48A and ensures the deployment of the lower air bag 52A toward the femoral regions 44 of the vehicle occupant 20.

Referring particularly to FIG. 5, the air bag restraint device 40A has inflated and deployed between the head 42 of the vehicle occupant 20 and the femoral regions 44 of the vehicle occupant 20 during a vehicle frontal collision.

In the embodiment of FIG. 5, the upper or head protection air bag 48A with the integral lower air bag 52A has deployed out of the shoulder belt portion 26 of the seat belt restraint device 10 in the same manner as the upper or head protection air bag 48 has (see FIG. 1). In other words, the upper or head protection air bag 48A and the integral lower air bag 52A is folded and accommodated in the shoulder belt portion 26.

As illustrated diagrammatically in FIG. 5, the upper thorax and the integral lower air bags 48A and 52A, when inflated, constitute a single bag as viewed from the outside. The partition 80 is disposed to divide the interior of the single bag into two chambers, the upper one for the air bag 48A, the lower one for the air bag 52A.

Via the deployment section 62, gas flows into the upper or head protection air bag 48A to inflate same. When the upper or head protection air bag 48A has inflated and deployed with the lower air bag 52A folded, the partition 80 is brought into a predetermined position as illustrated in FIG. 5. In the predetermined position, the partition 80 extends above the femoral regions 44 of the vehicle occupant 20 so that the folded lower air bag 52A lies between the upper or head protection air bag 48A and the femoral regions 44 of the vehicle occupant 20. The deployed upper or head protection air bag 48A keeps the partition 80 in the predetermined position during the subsequent process of deployment of the lower air bag 52A. Immediately after the upper or head protection air bag 48A has inflated, the one-way valve 82 opens due to an increase in the internal pressure within the upper or head protection air bag 48A to allow gas to flow into the lower air bag 52A. The lower air bag 52A inflates and deploys in a direction toward the femoral regions 44 of the vehicle occupant 20. The partition 80, which is kept in the illustrated predetermined position, ensures that the lower air bag 52A deploys in the direction toward the femoral regions 44 and rests against same. The lower air bag 52A, which directly rests against the femoral regions 44, indirectly supports the upper or head protection air bag 48A at the femoral regions 44 of the vehicle occupant 20, thus maintaining the upper or head protection air bag 48A in its predetermined position in the extreme proximity of the head 42 of the vehicle occupant 20. In the same manner as the embodiment of FIG. 1, the upper or head protection air bag 48A receives the load W (see FIG. 5) acting thereon from the head 42 of the vehicle occupant 20 and the integral lower air bag 52A indirectly supports the load W acting on the upper or head protection air bag 48 against the femoral regions 44 of the vehicle occupant 20. This provides for an increased efficiency of transmission of the load W to the femoral regions 44.

In the embodiment of FIG. 1, the upper and lower air bags 48 and 52 had vent holes 66 and 68, respectively. The function of the vent hole 66 was to release an excess gas thereby preventing internal pressure within the upper air bag 48 from exceeding a predetermined pressure value during the process of deployment and after deployment. The function of the vent hole 68 was to release an excess gas thereby preventing internal pressure within the lower air bag 52 from exceeding a predetermined pressure value during the process of deployment and after deployment. In contrast, in the embodiment of FIG. 5, the upper or head protection air bag 48A is provided with the one-way check valve 82 and the lower air bag 52A is provided with a vent hole 84. In the embodiment of FIG. 5, the one-way check valve 82 is open to release an excess gas thereby preventing internal pressure within the upper or head protection air bag 48A from exceeding a predetermined pressure value during the process of deployment and after deployment. In this embodiment, the one-way check valve 82 performs the function of a vent hole for the upper or head protection air bag 48A.

In the embodiment of FIG. 1, the lower air bag 52 was inflated upon supply of pressurized gas from the second gas tube 60, which extends through the lap belt portion 24, via the deployment section 64. In the embodiment of FIG. 5, the upper or head protection air bag 48A and the one-way check valve 82 performs the function of a tube connected to a gas generator or inflator. Except this, the gas supply system in embodiment of FIG. 5 is substantially the same as that in the embodiment of FIG. 1.

Generation of pressurized gas begins upon or immediately after activation of an inflator triggered by a command signal from an air bag control module. Similarly to the embodiment of FIG. 1, the air bag control module can determine that a frontal collision of the vehicle is imminent and generate the command signal immediately before the vehicle frontal collision. As the upper or head protection air bag 48A starts inflating in response to the command signal, the upper and lower air bags 48A and 52A will complete their deployment at an early timing immediately before or during the process of the vehicle frontal collision.

From the preceding description, it will be appreciated as an advantage of the embodiment of FIG. 5 that integrating the lower air bag 52A with the upper or head protection air bag 48A using the partition 80 provided with the one-way valve 82 provides for a considerable simplification of the air bag and gas supply system.

In the embodiment of FIG. 5, the upper and lower air bags 48A and 52A are accommodated in the shoulder belt portion at around the thorax 50 of the vehicle occupant 20. Because the upper and lower air bags 48A and 52A deploy out of the shoulder belt portion, the upper or head protection air bag 48A catches the head 42 immediately after the head 42 tends to swing forwardly during a vehicle frontal collision in the same manner as the embodiment of FIG. 1. This provides for a significant reduction in time required for the air bag restraint device 40A to restrain the head 42.

In the embodiment of FIG. 5, the air bag restraint device 40A extends to restrain the vehicle occupant 20 over an increased restraint range from the head 42 of the vehicle occupant 20 down to the femoral regions 44 in its deployed condition. Through this increased restraint range, the kinetic energy of the vehicle occupant 20 is absorbed. This provides for a significant increase in absorption amount of the kinetic energy of the vehicle occupant 20 thereby providing enhanced protection against injuries of the vehicle occupant 20.

In an accident condition where the dash panel moves into the passenger compartment, the knees of the vehicle occupant 20 are pressed from below during a vehicle frontal collision. In the embodiment of FIG. 5, the load acting on the knees is reduced by the lower air bag 52A resting against the femoral regions 44. This provides for a damper to protect injuries of the legs of the vehicle occupant 20 in the same manner as the embodiment of FIG. 1.

In the embodiment of FIG. 5, the femoral regions 44 are pressed against the seat from above via the lower air bag 52A similarly to the embodiment of FIG. 1. This prevents the waist of the vehicle occupant 20 from moving forwardly out of the restraint of the lap belt portion.

In each of the embodiments of FIGS. 1 and 5, the internal pressure within the air bag restraint device 40 or 40A is regulated to ensure an optimum protective effect for the vehicle occupant 20. The embodiment may be improved by forming a lower portion of the air bag restraint device deformable more easily than the other portion. The lower portion, when directly rests against the femoral regions 44 of the vehicle occupant 20, deforms easily to ensure an optimum cushion effect for the vehicle occupant 20 upon and immediately after the head 42 has swung into engagement with an upper portion of the air bag restraint device during a vehicle frontal collision. An air bag restraint device that ensures the optimum cushion effect is described below in connection with FIG. 6.

Third Embodiment

Figure 6:
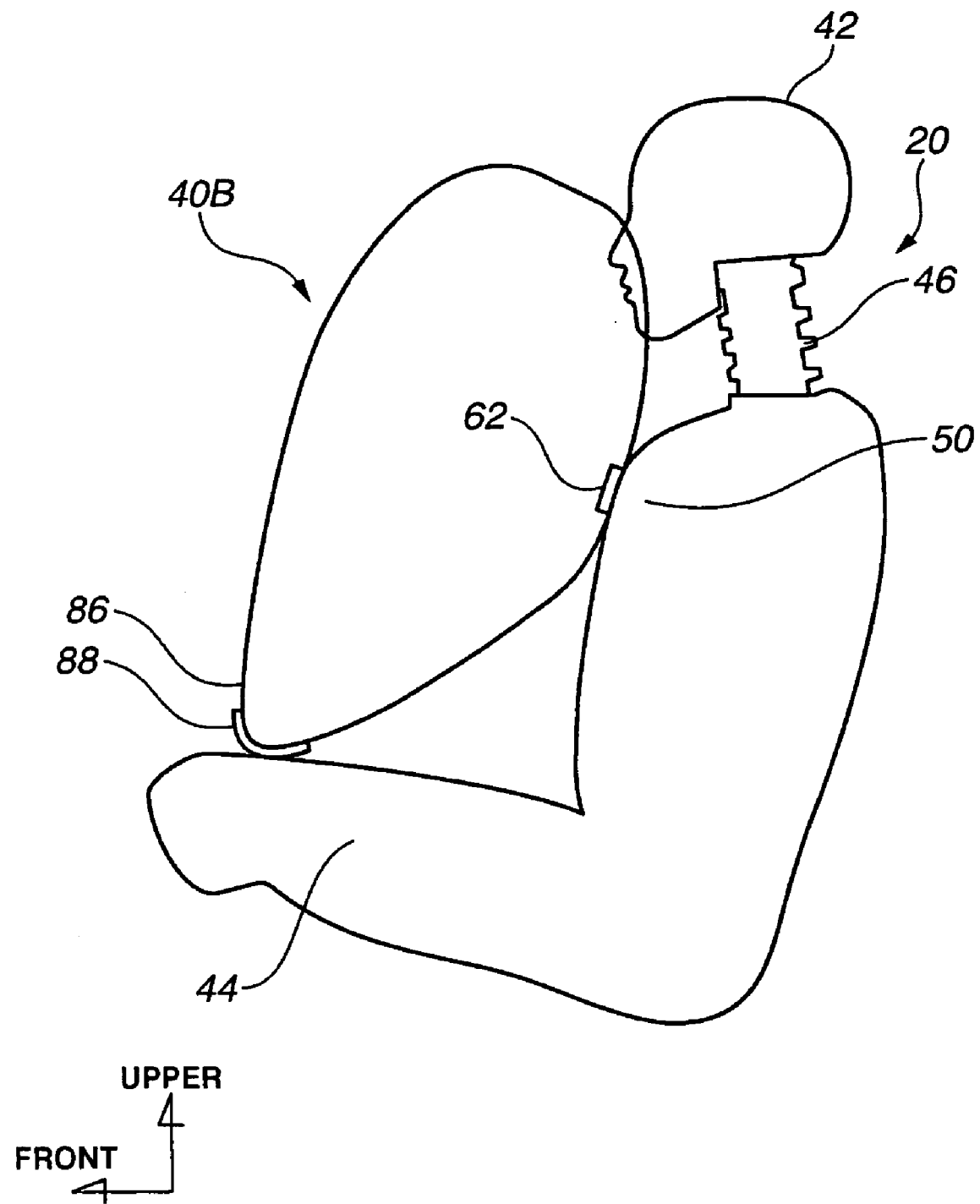
FIG. 6 shows a third embodiment of a vehicle occupant restraint system in a motor vehicle, according to the present invention.

FIG. 6 is a simplified illustration of a portion another embodiment of a vehicle occupant restraint system. This embodiment is substantially the same as the embodiment of FIG. 5 in that a three-point seat belt restraint device 10, which restrains a vehicle occupant 20, includes a shoulder belt portion 26 accommodating an air bag restraint device, and in that the air bag restraint device inflates and deploys between the head 42 and the femoral regions 44 when supplied with pressurized gas from a gas supply system via a deployment section 62.

However, the embodiment of FIG. 6 is different from the embodiment of FIG. 5 in the structure of a lower portion of the air bag restraint device that comes into engagement with the femoral regions 44 of the vehicle occupant 20 during the process of deployment.

Figure 7:
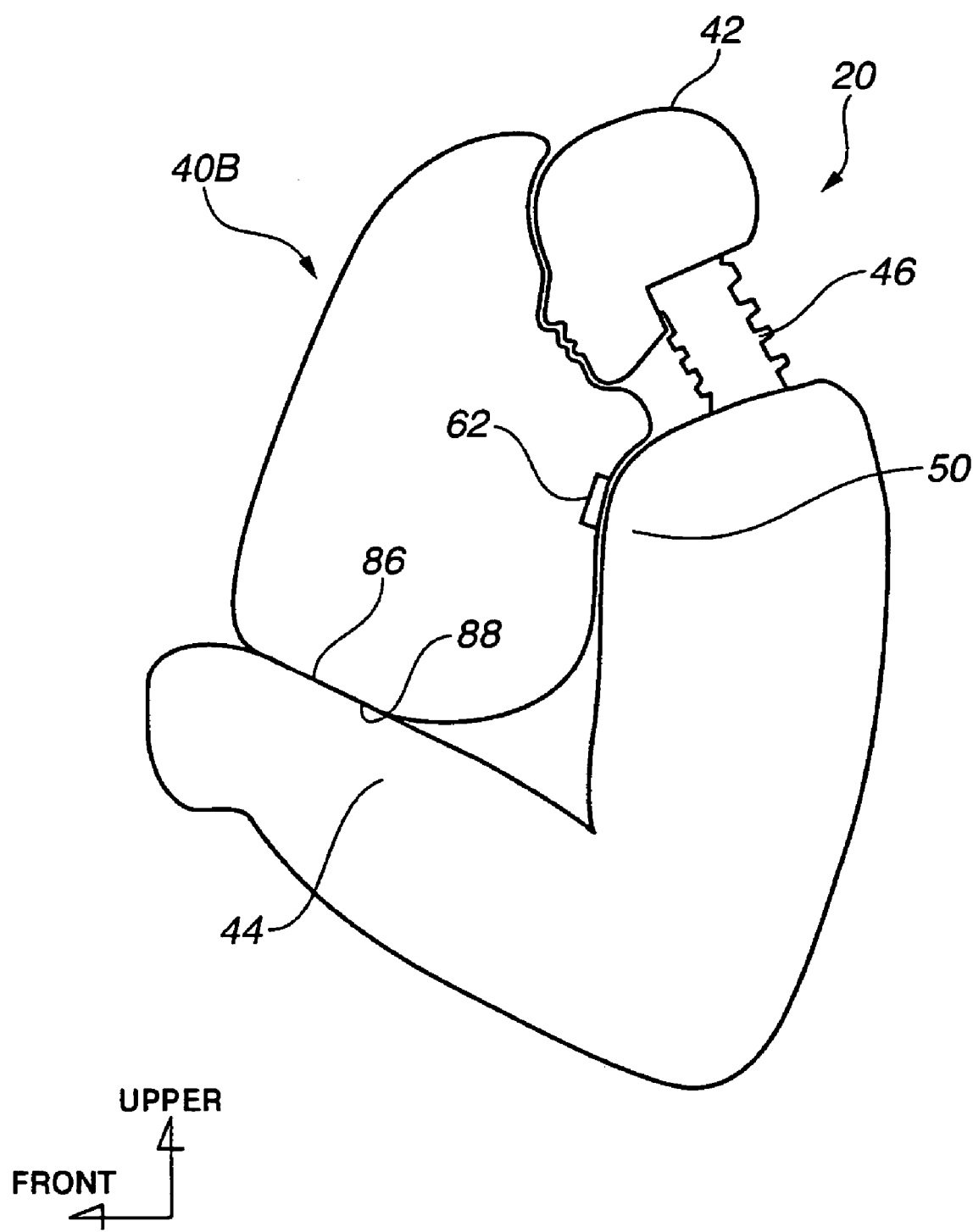
FIG. 7 shows how the presently filed embodiment of FIG. 6 works after the occupant's head has come into interference with the head protection air bag.

In FIG. 6, an air bag restraint device 40B, which includes a single air bag that doubles as the upper and lower air bags 48 and 52 shown in FIG. 1 or 48A and 52A in FIG. 5, has inflated and deployed out of the shoulder belt portion 26 from a portion around the thorax 50 of the vehicle occupant 20. FIG. 7 illustrates the air bag restraint device 40B after the head 42 of the vehicle occupant 20 has swung forwardly into engagement with an upper end portion of the deployed air bag restraint device 40B during a vehicle frontal collision. The air bag restraint device 40B has a lower end portion 86 opposite to the upper end portion. At the lower end portion 86, the air bag restraint device 40B directly rests against the femoral regions 44 of the vehicle occupant.

The lower end portion 86 of the air bag restraint device 40B is deformable more easily than the upper end portion is so that the lower end portion 86 is deformed as illustrated in FIG. 7 to absorb the load acting on the upper end portion when the head 42 comes into engagement with the upper end portion.

In the position illustrated in FIG. 6, the lower end portion 86 takes the form of a circular conic. In the embodiment, at least a portion of the outer surface of the circular conic has high-friction surface treatment as indicated at the reference numeral 88, so that an optimum firm engagement of the circular conic with the femoral regions 44 is ensured. During a shift from the position of FIG. 6 to the position of FIG. 7, the load acting on the upper end portion flattens the circular conic of the lower end portion 88 to expand area through which the air bag restraint device 40B rests against the femoral region 44.

As shown in FIG. 7, immediately after the head 42 of the vehicle occupant 20 has swung forwardly into interference with the upper end portion of the air bag restraint device 40B during a vehicle frontal collision, the circular conic of the lower end portion 90 is flattened. This ensures efficient energy absorption during an early stage immediately after the interference of the head 42 with the upper end portion of the air bag restraint device 40B.

Through the flattened circular conic of the lower end portion 86, the air bag restraint device 40B rests against the femoral regions 44. The air bag restraint device 40B, which rests against the femoral regions 44, supports the load acting on the upper end portion of the air bag restraint device 40B on the femoral regions 44.

The high-friction surface treatment at 88 ensures the optimum firm engagement of the circular conic of the lower end portion 86 with the femoral regions 44 during and after deployment of the air bag restraint device 40B.

In the embodiment of FIG. 6, the air bag restraint device 40B is accommodated in the shoulder belt portion at around the thorax 50 of the vehicle occupant 20. Because the air bag restraint device 40B deploys out of the shoulder belt portion, the upper end portion catches the head 42 immediately after the head 42 tends to swing forwardly during a vehicle frontal collision in the same manner as the embodiment of FIG. 1. This provides for a significant reduction in time required for the air bag restraint device 40B to restrain the head 42.

In the illustrated position of FIG. 7, the air bag restraint device 40B extends to restrain the vehicle occupant 20 over an increased restraint range from the head 42 of the vehicle occupant 20 down to the femoral regions 44 in its deployed condition. Through this increased restraint range, the kinetic energy of the vehicle occupant 20 is absorbed. This provides for a significant increase in absorption amount of the kinetic energy of the vehicle occupant 20 thereby providing enhanced protection against injuries of the vehicle occupant 20.

In an accident condition where the dash panel moves into the passenger compartment, the knees of the vehicle occupant 20 are pressed from below during a vehicle frontal collision. In the embodiment of FIG. 6, the load acting on the knees is reduced by the air bag resting against the femoral regions 44. This provides for a damper to protect injuries of the legs of the vehicle occupant 20 in the same manner as the embodiment of FIG. 1.

In the illustrated position of FIG. 7, the femoral regions 44 are pressed against the seat from above similarly to the embodiment of FIG. 1. This prevents the waist of the vehicle occupant 20 from moving forwardly out of the restraint of the lap belt portion.

In the preceding description of the embodiment of FIG. 6, the lower end portion 86, which takes the form of a circular cone, is deformable more easily than the upper end portion is. The lower end portion 86 may take any appropriate form or configuration other than a circular cone as long as it deforms easily against the load acting on the upper end portion of the air bag. If desired, the upper end portion of the air bag restraint device 40B may be deformable more easily than the lower end portion is without impairing the protective effect.

Fourth Embodiment

Figure 8:
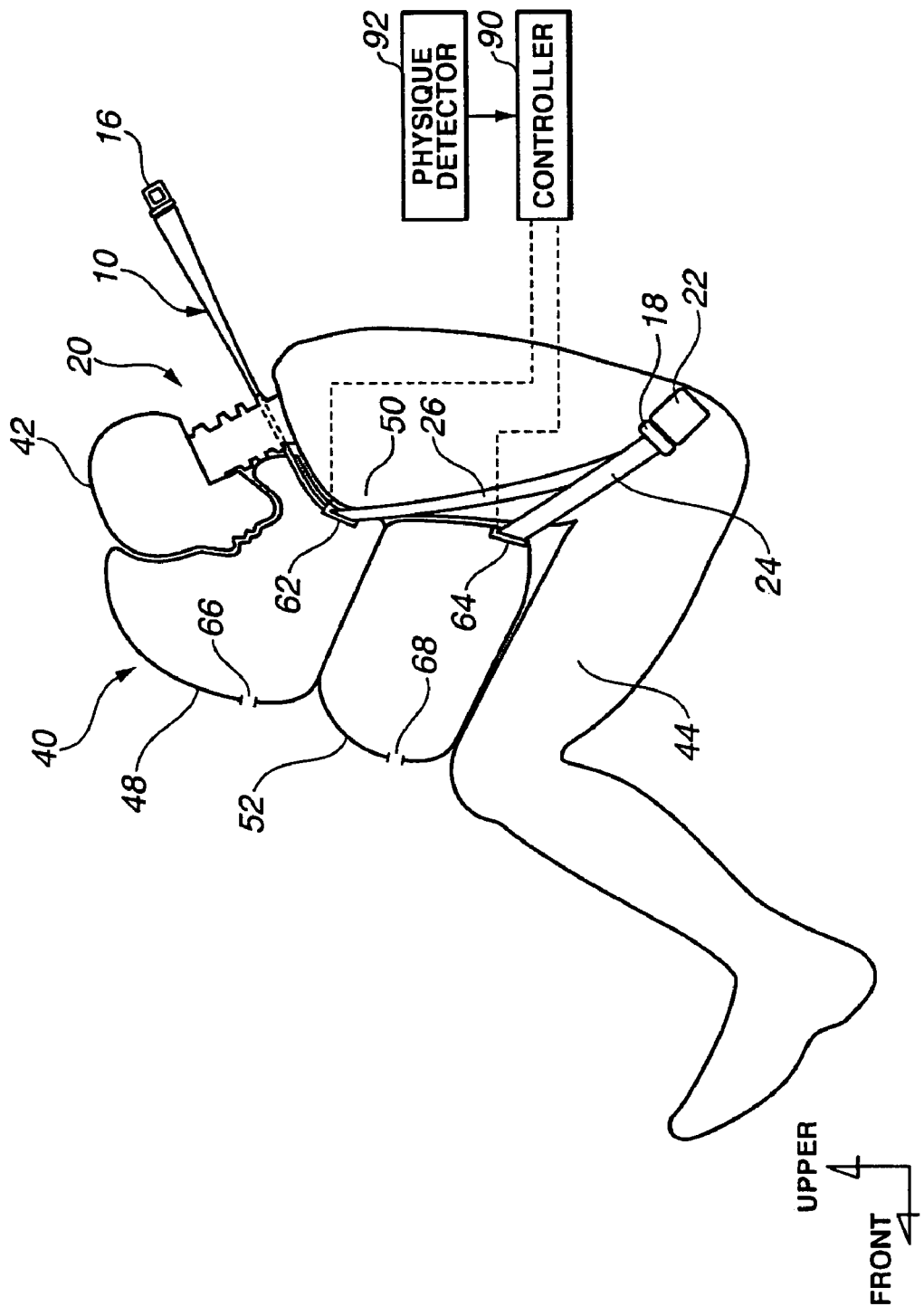
FIG. 8 shows a fourth embodiment of a vehicle occupant restraint system in a motor vehicle in a first activated condition, according to the present invention.
Figure 9:
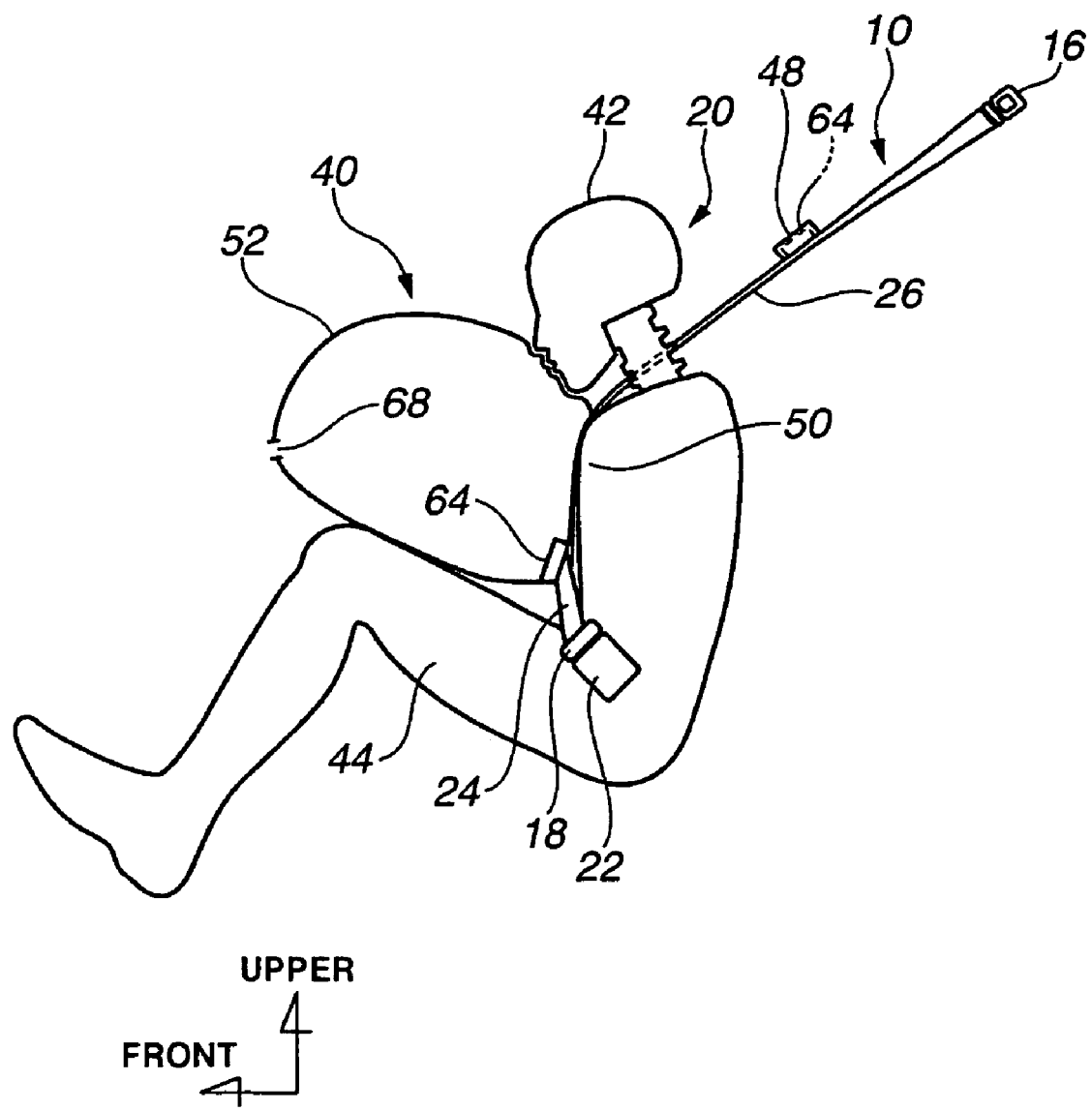
FIG. 9 shows the presently filed embodiment of FIG. 8 in a second activated condition.

FIGS. 8 and 9 show a portion of another embodiment of a vehicle occupant restraint system. This embodiment is substantially the same as the embodiment of FIG. 1, but different from the latter in that the upper and lower air bags 48 and 52 are inflated corresponding to varying of requirements with different physique of a vehicle occupant 20. To accomplish this, a controller 90 and a physique detector 92 are additionally provided.

FIG. 8 shows a deployed condition of the vehicle occupant restraint system in a first state, while FIG. 9 shows a deployed condition of the vehicle occupant restraint system in a second state.

In the embodiment of FIG. 8, the physique detector 92 detects the physique of the vehicle occupant 20 after appropriate arithmetic operation based on signals from a seat installed pressure sensor, an interior-view camera, and a temperature and/or pressure sensor installed in a shoulder belt portion 26. The physique detector 92 provides an output to the controller 90. The controller 90 provides control signal to first and second deployment sections 62 and 64 for the respective upper and lower air bags 48 and 52.

In the state illustrated by FIG. 8, the vehicle occupant 20 is an adult (representatively, from a 5 percentile female to 95 percentile male) and both upper and lower air bags 48 and 52 have inflated and deployed in the same manner as the embodiment of FIG. 1. In the state illustrated by FIG. 9, the vehicle occupant 20 is a child that representatively corresponds to a dummy model having a dimension of six years old child. In this illustrated state, the supply of pressurized gas to the upper air bag 48 is blocked and the lower air bag 52 only has inflated and deployed. In each of the state, the air bag restraint device 40 has inflated and deployed between the head 42 and the femoral regions 44 to support the head 42 on the femoral regions 44.

In the embodiment of FIG. 8, the air bag restraint device 40 can be inflated corresponding to varying of requirements with different physique of the vehicle occupant 20. In the preceding description of this embodiment, the supply of gas to the upper air bag 48 is allowed or blocked in response to the control signals from the controller 90. If desired, the volume of gas supplied to the air bag restraint device 40 may be regulated.

In the embodiment of FIG. 8, the air bag restraint device 40 is accommodated in the shoulder belt portion 26 at around the thorax 50 of the vehicle occupant 20. Because the air bag restraint device 40 deploys out of the shoulder belt portion 26, the upper end portion catches the head 42 immediately after the head 42 tends to swing forwardly during a vehicle frontal collision in the same manner as the embodiment of FIG. 1. This provides for a significant reduction in time required for the air bag restraint device 40 to restrain the head 42.

In the embodiment of FIG. 8, the air bag restraint device 40 extends to restrain the vehicle occupant 20 over an increased restraint range from the head 42 down to the femoral regions 44 in its deployed condition. Through this increased restraint range, the kinetic energy of the vehicle occupant 20 is absorbed. This provides for a significant increase in absorption amount of the kinetic energy of the vehicle occupant 20 thereby providing enhanced protection against injuries of the vehicle occupant 20.

In an accident condition where the dash panel moves into the passenger compartment, the knees of the vehicle occupant 20 are pressed from below during a vehicle frontal collision. In the embodiment of FIG. 8, the load acting on the knees is reduced by the air bag resting against the femoral regions 44. This provides for a damper to protect injuries of the legs of the vehicle occupant 20 in the same manner as the embodiment of FIG. 1.

In the embodiment of FIG. 8, the femoral regions 44 are pressed against the seat from above similarly to the embodiment of FIG. 1. This prevents the waist of the vehicle occupant 20 from moving forwardly out of the restraint of the lap belt portion.

In each of the embodiments, the seat belt restraint device 10 has been described taking a three-point seat belt device as an example. The seat belt restraint device 10 may take the form of a four-point seat belt device.

Fifth Embodiment

Figure 10:
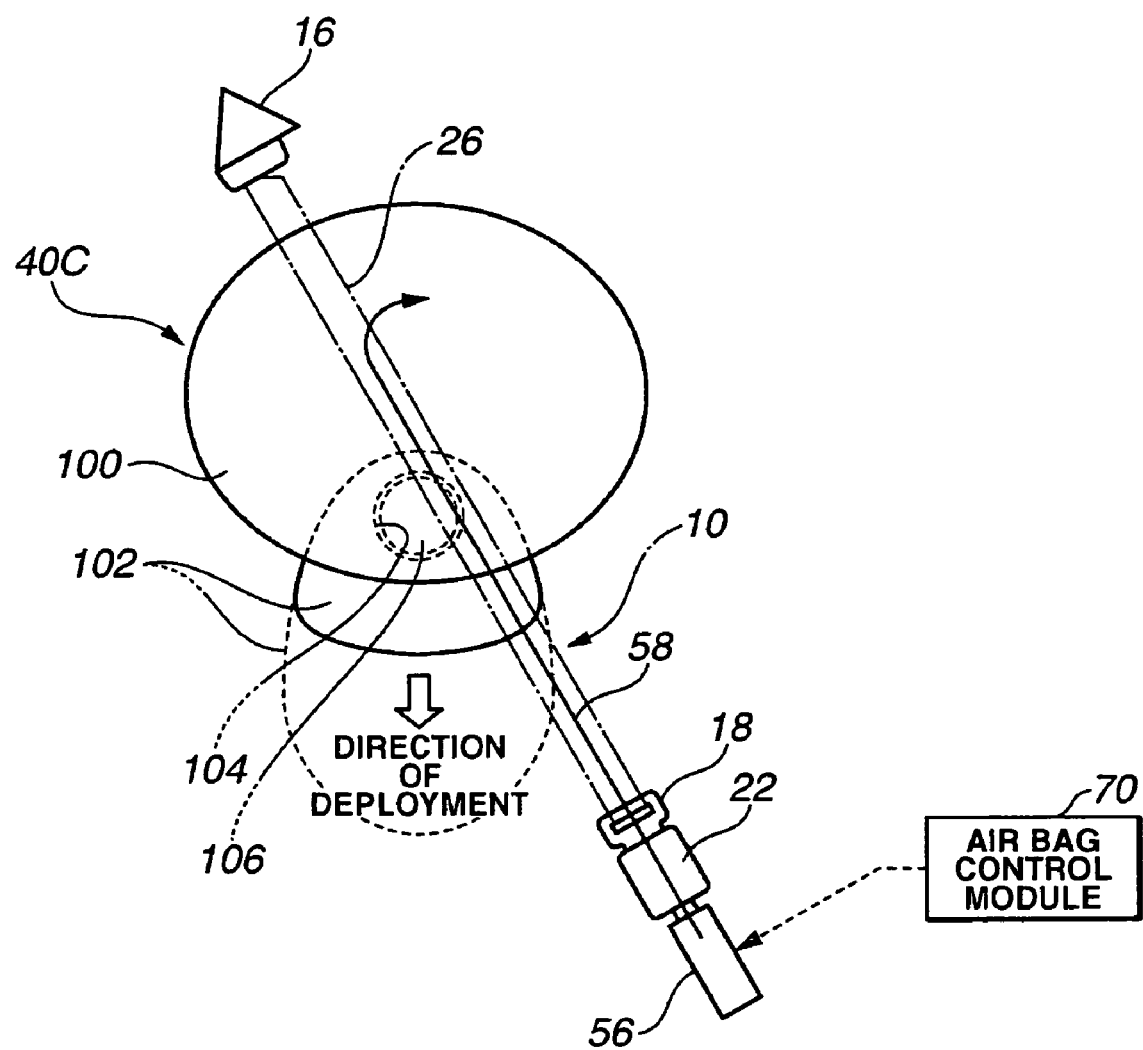
FIG. 10 shows a fifth embodiment of a driver-side vehicle occupant restraint system in a motor vehicle showing a head protection air bag inflated out of a shoulder belt portion of a seat belt restraint device, according to the present invention.
Figure 11:
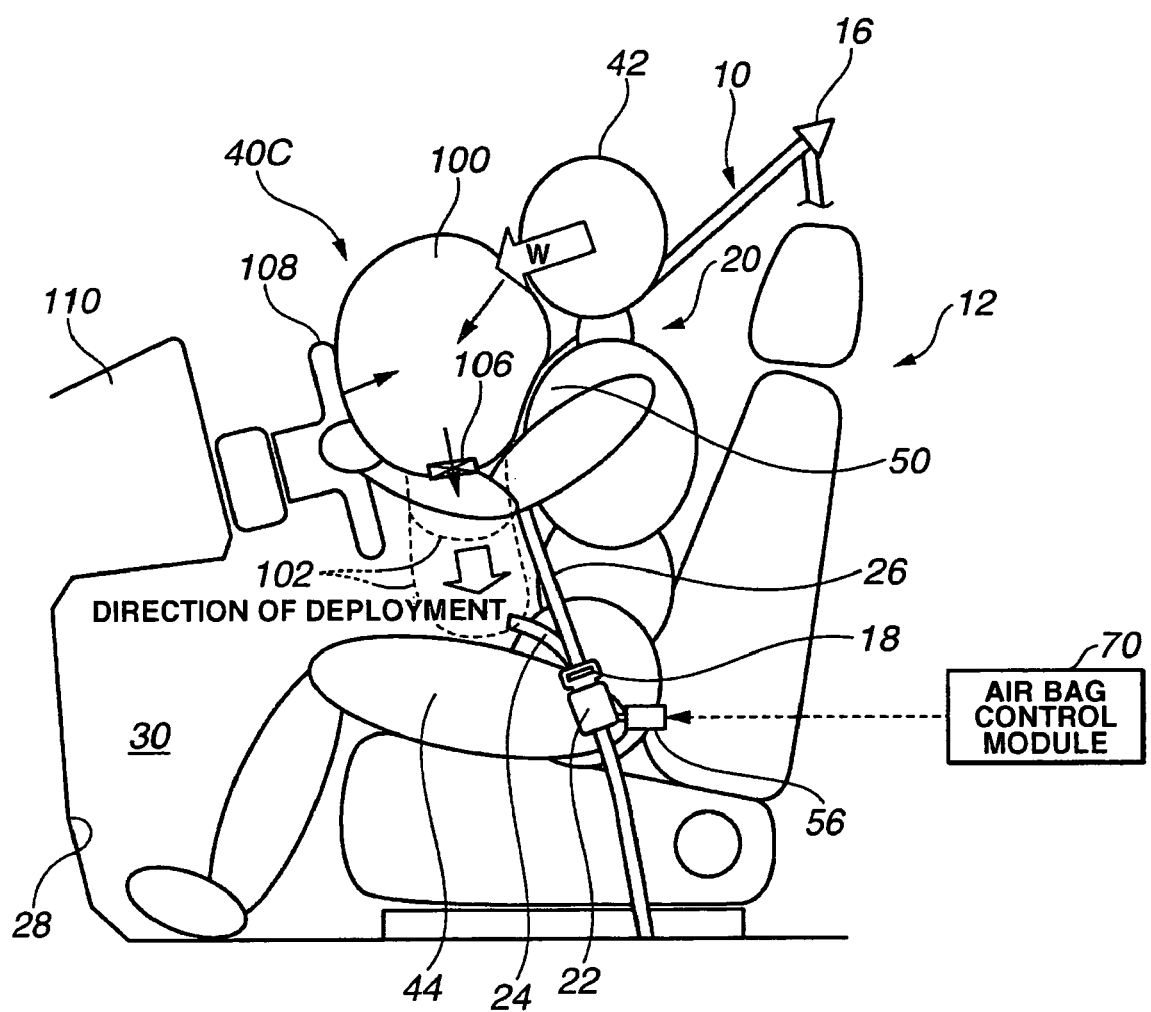
FIG. 11 shows how the presently filed embodiment of FIG. 10 works during a vehicle frontal collision.

Referring to FIGS. 10 and 11, another embodiment of a vehicle occupant restraint system is described. FIG. 10 is a top plan view, in diagram, illustrating an air bag restraint device 40C, which has deployed out of a shoulder belt portion 26 of a three-point seat belt restraint device 10 shown in phantom to indicate a flow of gas passing through a gas tube 58 of a gas supply system. FIG. 11 is a side view illustrating the vehicle occupant restraining system for the driver of a motor vehicle.

This embodiment of FIG. 11 largely corresponds to the embodiment of FIG. 5. The vehicle occupant restraint system shown in FIG. 11 differs from the system represented in FIG. 5. In the system represented in FIG. 5, the first or upper or head protection air bag 48A is held in its predetermined position after the second or lower integral air bag 52A has deployed in the predetermined direction toward the femoral regions 44 of the vehicle occupant 20. In contrast to the system represented in FIG. 5, a first or upper or head protection air bag 100, which has deployed out of a shoulder belt portion 26, is held in its predetermined position before deployment of a second or lower integral air bag 102 in a predetermined direction toward the femoral regions 44 of the vehicle occupant 20.

In FIGS. 10 and 11, an air bag restraint device of the vehicle occupant restraint system is generally denoted at 40C. In contrast to the air bag restraint device 40A, the first air bag 100 has deployed from the lap belt portion 26 to a steering wheel 108 projecting from a dashboard 110 in the motor vehicle. The deployed first air bag 100 directly rests against the steering wheel 108 to assume its predetermined position. The head 42 and thorax 50 come into interference with the first air bag 100 during a vehicle frontal collision. After they have come into interference with the first air bag 100, the first air bag 100 is interposed and compressed between the steering wheel 108 and the vehicle occupant 20, causing an increase in the internal pressure within the first air bag 100. The increase in the internal pressure allows admission of gas into the second integral air bag 102. The second integral air bag 102 deploys in a downward direction toward the femoral regions 44 to restrict the legs of the vehicle occupant 20 against a seat 12.

According to a method aspect of the embodiment of FIG. 11, a vehicle occupant restraint method comprises deploying the first air bag 100 out of the shoulder belt portion 26 to extend between the vehicle occupant 20 and the steering wheel 108; compressing the first air bag 100 between the vehicle occupant 20 and the steering wheel 108 to cause an increase in the internal pressure within the first air bag 100 after the vehicle occupant 20 has come into interference with the first air bag 100; and deploying the second air bag 102 in a downward direction, due to an increase in the internal pressure within the first air bag 100, to restrict the femoral regions 44 of the vehicle occupant 20.

In the embodiment shown in FIGS. 10 and 11, the air bag restraint device 40C was accommodated in the three-point belt restraint device 10. Particularly, the first air bag 100 and the second integral air bag 102 were accommodated I the shoulder belt portion 26.

The second air bag 102 is integrated with the first air bag 100 at a lower side thereof. A vent hole 104 is provided to allow communication between the second integral air bag 102 and the first air bag 100. The vent hole 104 has a predetermined cross sectional area.

A one-way valve 106 is provided to close the vent hole 104. The one-way valve 106 open to admit gas into the second integral air bag 102 past the vent hole 104 when the internal pressure within the first air bag 100 exceeds a predetermined pressure value due to compression of the first air bag 100 between the vehicle occupant 20 and the steering wheel 108.

As shown in FIG. 11, the three-point seat belt device 10 includes a single belt. One end of the belt is mounted to a retractor, while the other end is anchored to the seat 12 or the vehicle body of the motor vehicle or mounted to another retractor. The seat belt extends through a shoulder through ring 16 anchored to an upper portion of the vehicle body 14, for example, an upper portion of a center pillar. A seat belt tongue 18 is connected to the belt intermediate to the belt ends. The tongue 18 may be swung across a vehicle occupant 20 and engaged with a buckle 22 fixed to the seat 12, thereby positioning a lap belt portion 24 of the belt across the lap and a shoulder belt portion 26 of the belt across the upper torso.

The first air bag 100, which was accommodated in the shoulder belt portion 26, is connected to one end of a gas tube 58 (see FIG. 10) extending through the lap belt portion 26. The other end of the gas tube 58 communicates with the interior of the seat belt tongue 18.

The interior of the seat belt tongue 18 is brought into communication with the interior of the buckle 22 when the seat belt tongue 18 is inserted into and engaged with the buckle 22. The interior of the buckle 22 communicates with an inflator 56. Pressurized gas generated by the inflator 56 is supplied to the gas tube 58 via the buckle 22 and seat belt tongue 18. Via the gas tube 58, the pressurized gas is supplied to the first air bag 100.

Generation of pressurized gas begins upon or immediately after activation of the inflator 56 triggered by a command signal from an air bag control module 70. In the illustrated embodiment, the air bag control module 70 can determine that a frontal collision of the vehicle is imminent and generate the command signal immediately before the vehicle frontal collision. Via the gas tube 58, the gas is supplied to the first air bag 100.

Then, the first air bag 100 begins inflating. The first air bag 100 deploys out of the shoulder belt portion 26 and extends between the vehicle occupant 20 and the steering wheel 108.

As shown in FIG. 11, the deployed first air bag 100 catches the upper torso of the vehicle occupant 20 thrown forwardly during a vehicle frontal collision, preventing a possible contact of the vehicle occupant 20 with the steering wheel 108.

The first air bag 100 is compressed between the vehicle occupant 20 and the steering wheel 108 after the vehicle occupant 20 has come into interference with the first air bag 100. This causes an increase in the internal pressure. The one-way valve 106 opens, allowing gas to flow into the second integral air bag 102. The second integral air bag 102 deploys in a downward direction as indicated by the illustrated arrow in FIG. 11.

The deployed second integral air bag 102 presses the femoral regions 44 of the vehicle occupant 20 to restrict same.

In the embodiment of FIG. 11, the deployed first air bag 100 protects the head 42 and thorax 50 of the vehicle occupant 20, and the deployed second air bag 102 restricts the femoral regions 44 of the vehicle occupant 20.

In the embodiment of FIG. 11, the air bag restraint device 40C extends to restrain the vehicle occupant 20 over an increased restraint range from the head 42 down to the femoral regions 44 in its deployed condition. Through this increased restraint range, the kinetic energy of the vehicle occupant 20 is absorbed. This provides for a significant increase in absorption amount of the kinetic energy of the vehicle occupant 20 thereby providing enhanced protection against injuries of the vehicle occupant 20.

Because the one-way valve 106 opens to release excessive gas from the first air bag 100 when the internal pressure reaches a predetermined pressure, the reaction to interference of the vehicle occupant 20 with the first air bag 100 is suppressed. This provides for an increased performance of the first air bag 100 to catch the head 42 and the thorax 50 of the vehicle occupant 20.

In the embodiment of FIG. 11, the second integral air bag 102 presses the femoral regions 44 against the seat 12 similarly to the embodiment of FIG. 1. This prevents the waist of the vehicle occupant 20 from moving forwardly out of the restraint of the lap belt portion 24, providing enhanced protection for the vehicle occupant 20.

The steering wheel 108 supports the first air bag 100 during the interference between the first air bag 100 and the vehicle occupant 20. This provides for an increase in capability of the first air bag 100 to restrain the head 42 and the thorax 50 of the vehicle occupant 20.

Because they are accommodated in the shoulder belt portion 26, the first air bag 100 and the second integral air bag 102 may be stored at any elevated position appropriate for deployment of the first air bag 100.

Sixth Embodiment

Figure 12:
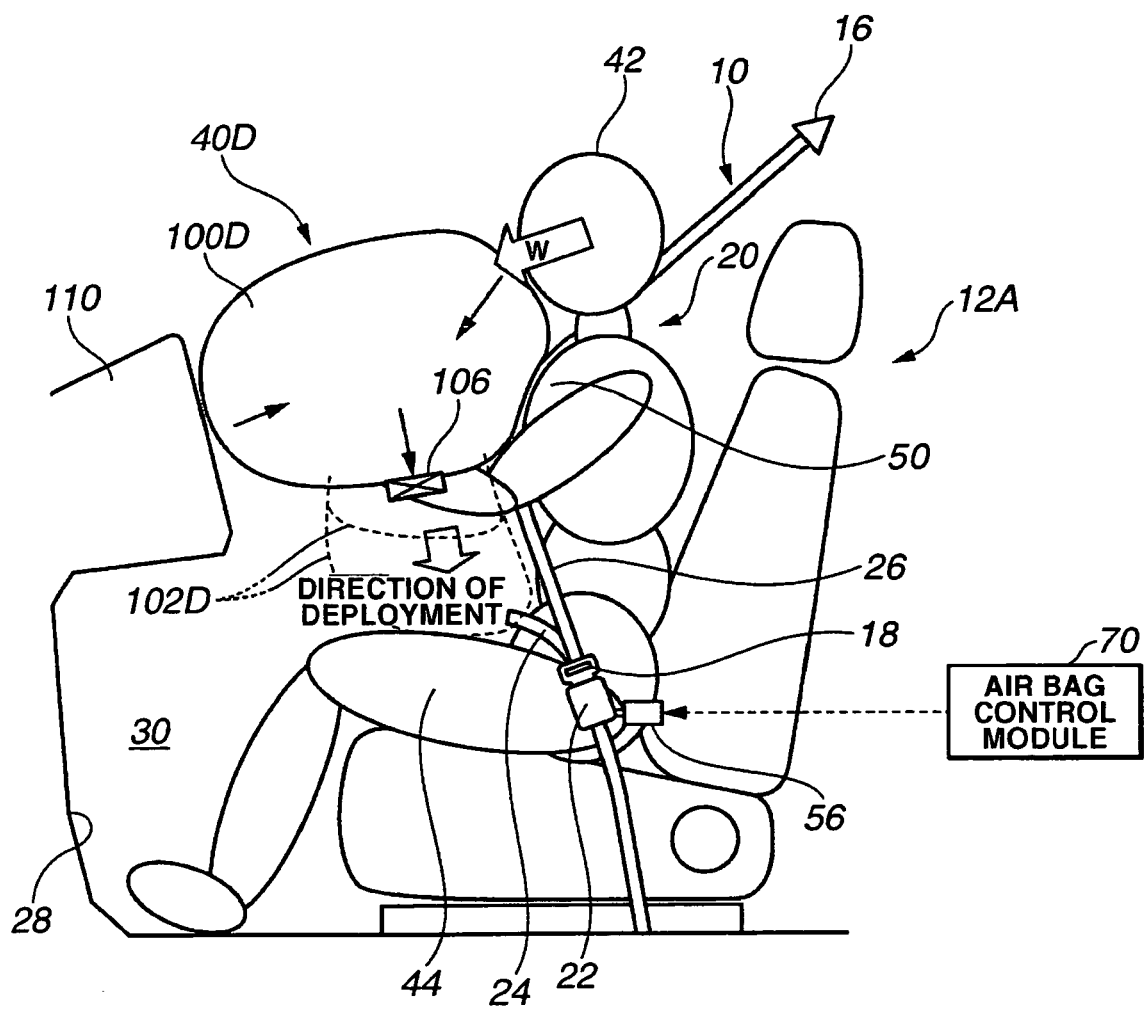
FIG. 12 shows a sixth embodiment of a passenger-side vehicle occupant restraint system in a motor vehicle, according to the present invention.

FIG. 12 shows a vehicle occupant restraint system for the passenger of a motor vehicle, which largely corresponds to the system represented in FIG. 11.

In the embodiment of FIG. 12, in contrast to the system shown in FIG. 11, the passenger is seated on a front passenger seat 12A in the motor vehicle. In contrast to the system shown in FIG. 11, a first air bag 100D of an air bag restraint device 40D, which has deployed out of a lap belt portion 26, is interposed and compressed between a vehicle occupant 20 and a portion of a dashboard 110 facing the thorax 50 of the vehicle occupant 20. The air bag restraint device 40D includes a second integral air bag 102D that corresponds to the second integral air bag 102 shown in FIG. 11. Incidentally, a seat belt restraint device 10 illustrated as having a tongue 18, a buckle 22 and an inflator 56 in FIG. 12 is symmetrically arranged in comparison with that of FIG. 11 with respect to the sheet thereof.

Seventh Embodiment

Figure 13:
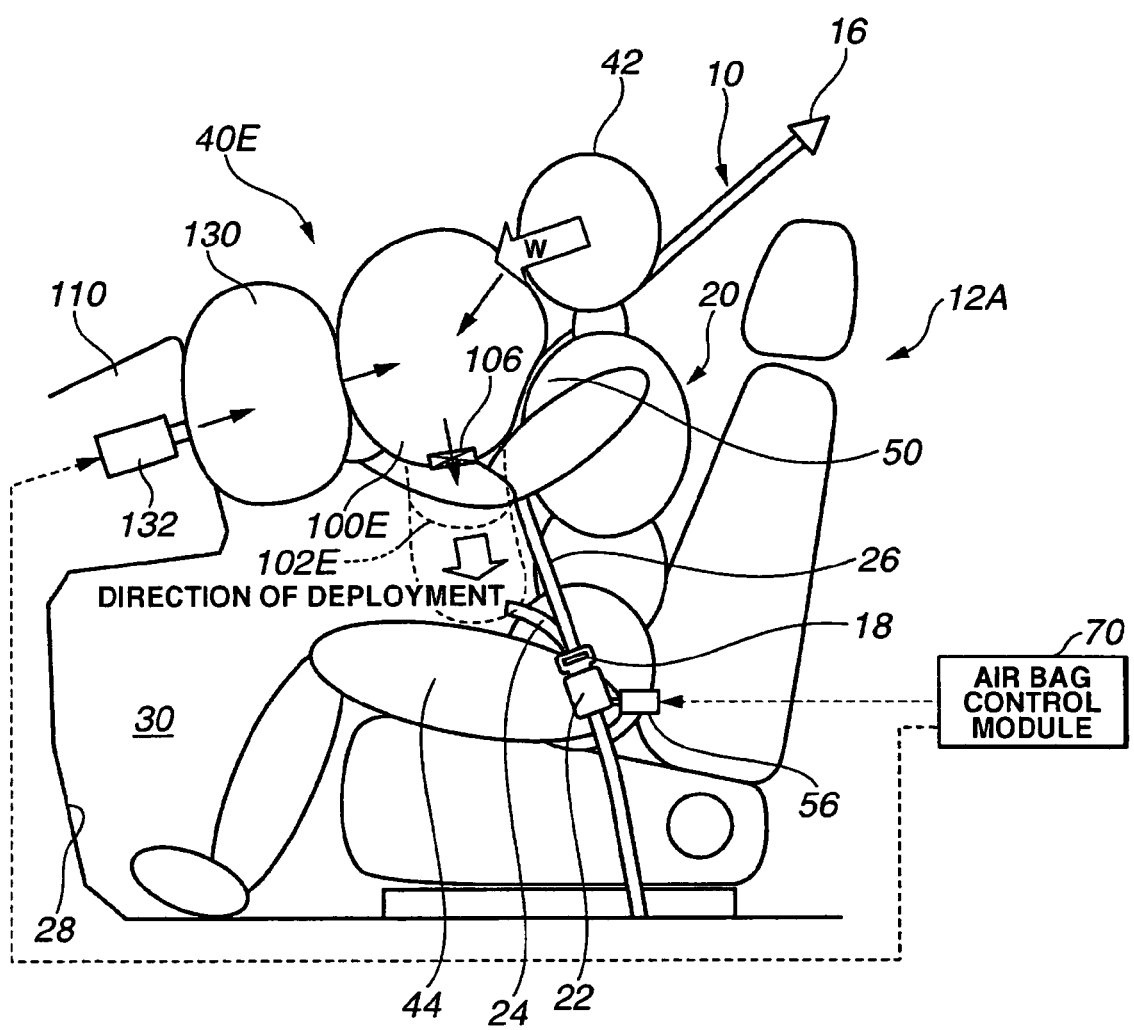
FIG. 13 shows a seventh embodiment of a passenger-side vehicle occupant restraint system in a motor vehicle, according to the present invention.

FIG. 13 shows a vehicle occupant restraint system for the passenger of a motor vehicle, which largely corresponds to the system represented in FIG. 12.

In the embodiment of FIG. 13, in contrast to the system shown in FIG. 12, a third air bag 130 has deployed from a dashboard 110 to perform the function of an elevated support for a first air bag 100E of an air bag restraint device 40E. The first air bag 100E, which has deployed out of a shoulder belt portion 26, is interposed and compressed between the third air bag 130 and a vehicle occupant 20. In the dashboard 110, there is indicated a gas generator or inflator 132 that is activated in response to a control signal from an air bag control module 70. By means of the inflator 132, the third air bag 130 is inflated.

Eighth Embodiment

Figure 14:
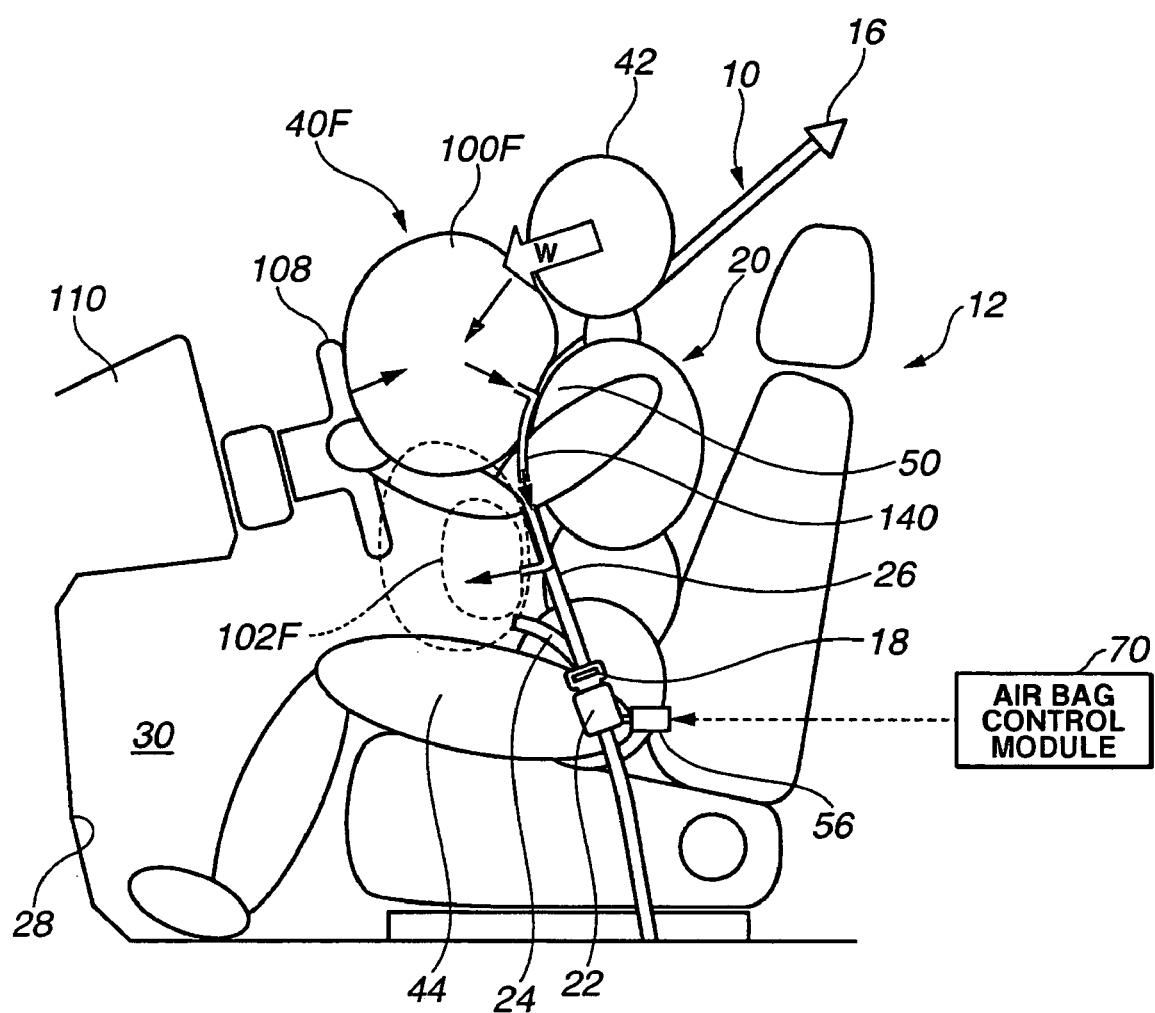
FIG. 14 shows an eighth embodiment of a driver-side vehicle occupant restraint system in a motor vehicle, according to the present invention.

FIG. 14 shows a vehicle occupant restraint system for the driver of a motor vehicle, which largely corresponds to the system represented in FIG. 11, but without the second integral air bag 102.

In the embodiment of FIG. 14, in contrast to the system shown in FIG. 11, a second air bag 102F, which is separate from a first air bag 100F of an air bag restraint device 40F, is accommodated in a shoulder belt portion 26. There is indicated a tube 140 extending through the shoulder belt portion 26. Through this tube 140, gas is supplied from the first air bag 100F to the second air bag 102F when the internal pressure within the first air bag reaches a predetermined pressure. A one-way valve, which opens to allow the supply of gas though the tube 140, is provided. The gas supplied through the tube 140 inflates the second air bag 102F. The second air bag 102 deploys out of the shoulder belt portion 26 between the deployed first air bag 100F and the femoral regions 44 of the vehicle occupant 20.

Ninth Embodiment

Figure 15:
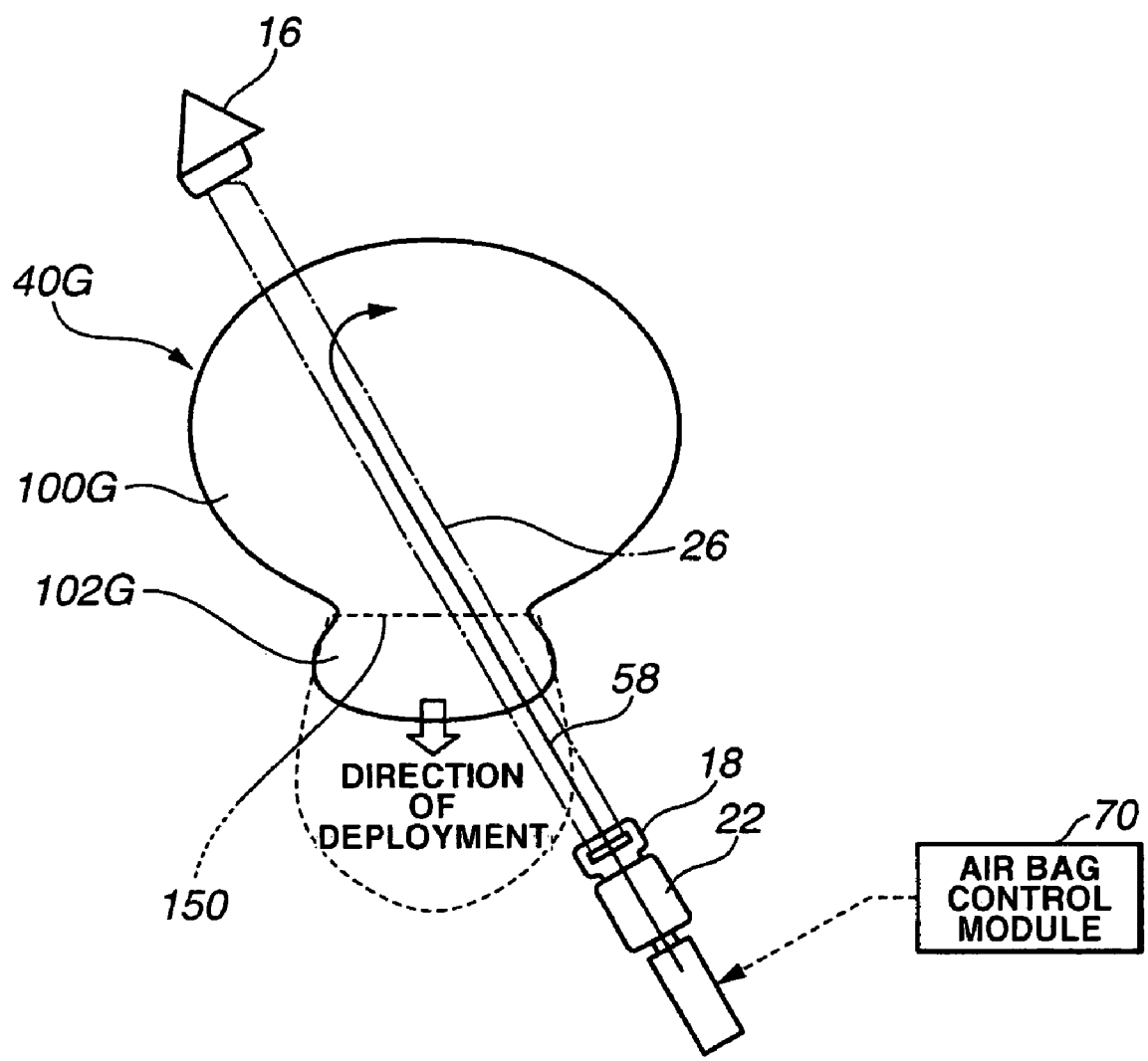
FIG. 15 shows a ninth embodiment of a driver-side vehicle occupant restraint system in a motor vehicle showing a head protection air bag inflated out of a shoulder belt portion of a seat belt restraint device, according to the present invention.
Figure 16:
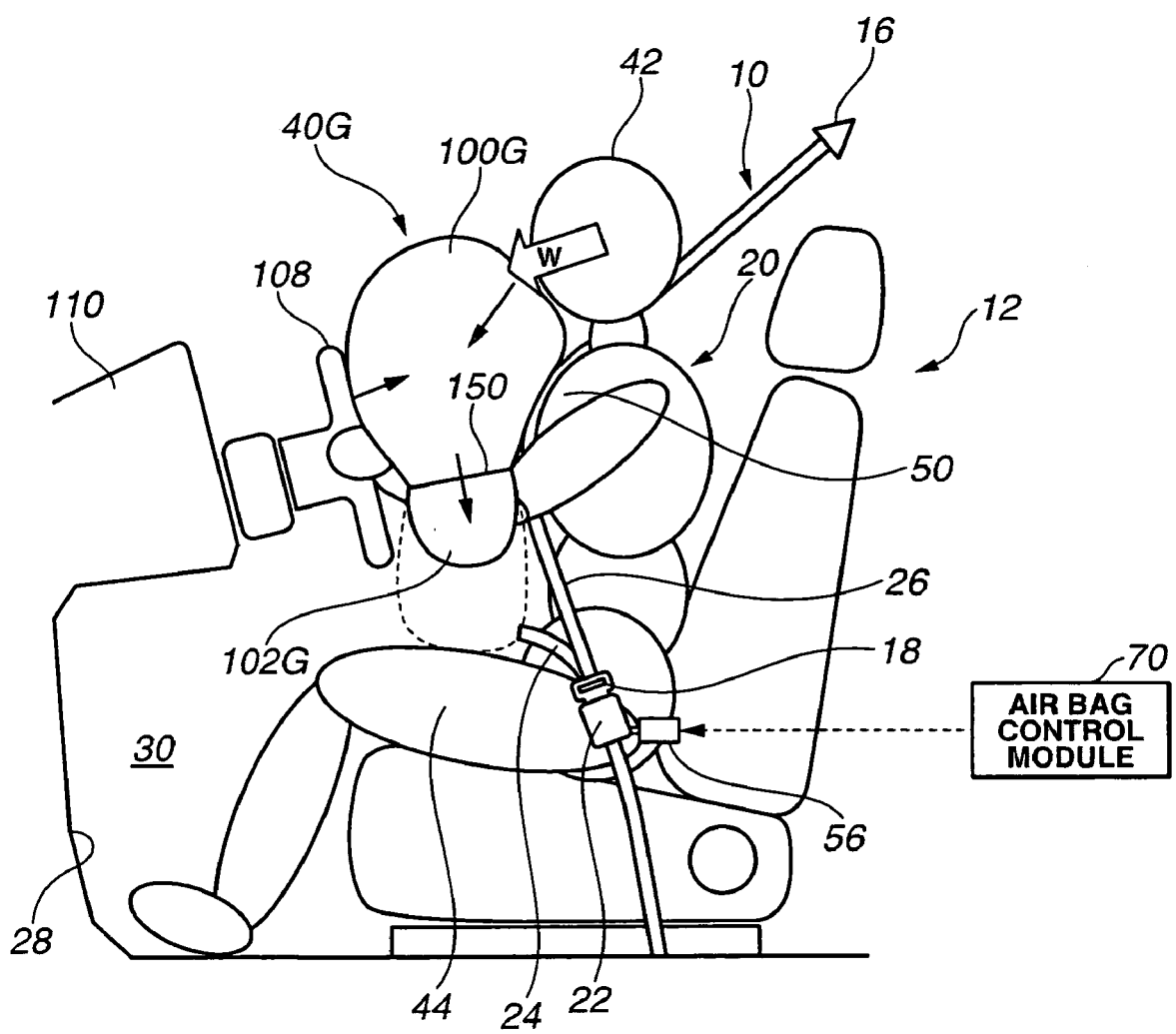
FIG. 16 shows how the presently filed embodiment of FIG. 15 works during a vehicle frontal collision.

FIGS. 15 and 16 show a vehicle occupant restraint system for the driver of a motor vehicle, which largely corresponds to the system shown in FIGS. 10 and 11, but without the one-way valve 106 and the vent hole 104. In contrast to the system shown in FIGS. 10 and 11, a permeable membrane 150 separates a second integral air bag 102G from a first air bag 100G of an air bag restraint device 40G. Through the permeable membrane 150, gas is supplied to the second integral air bag 102G when the internal pressure within the first air bag 100G reaches a predetermined pressure.

In the preceding description of the embodiments shown in FIGS. 10 to 16, a first air bag (100, 100D, 100E, 100F, 100G) is interposed and compressed between a vehicle occupant 20 and a vehicle-side member, such as, a steering wheel 108, a dashboard 110, an elevated support in the form of a third air bag 130 deployed out of the dashboard 110. In the restraint system for the driver in a motor vehicle, the first air bag was interposed and compressed between the vehicle occupant (driver) 20 and the steering wheel 108. In contrast to this restraint system for the driver, the first air bag may be interposed and compressed between the vehicle occupant (driver) 20 and the dashboard 110 or a third air bag, which has deployed out of a fixture appropriately mounted in front of the thorax 50 of the vehicle occupant 20.

In the preceding description of the embodiments shown in FIGS. 10 to 16, the seat belt restraint device 10 has been described taking a three-point seat belt device as an example. The seat belt restraint device 10 may take the form of a four-point seat belt device.

Tenth Embodiment

Figure 17:
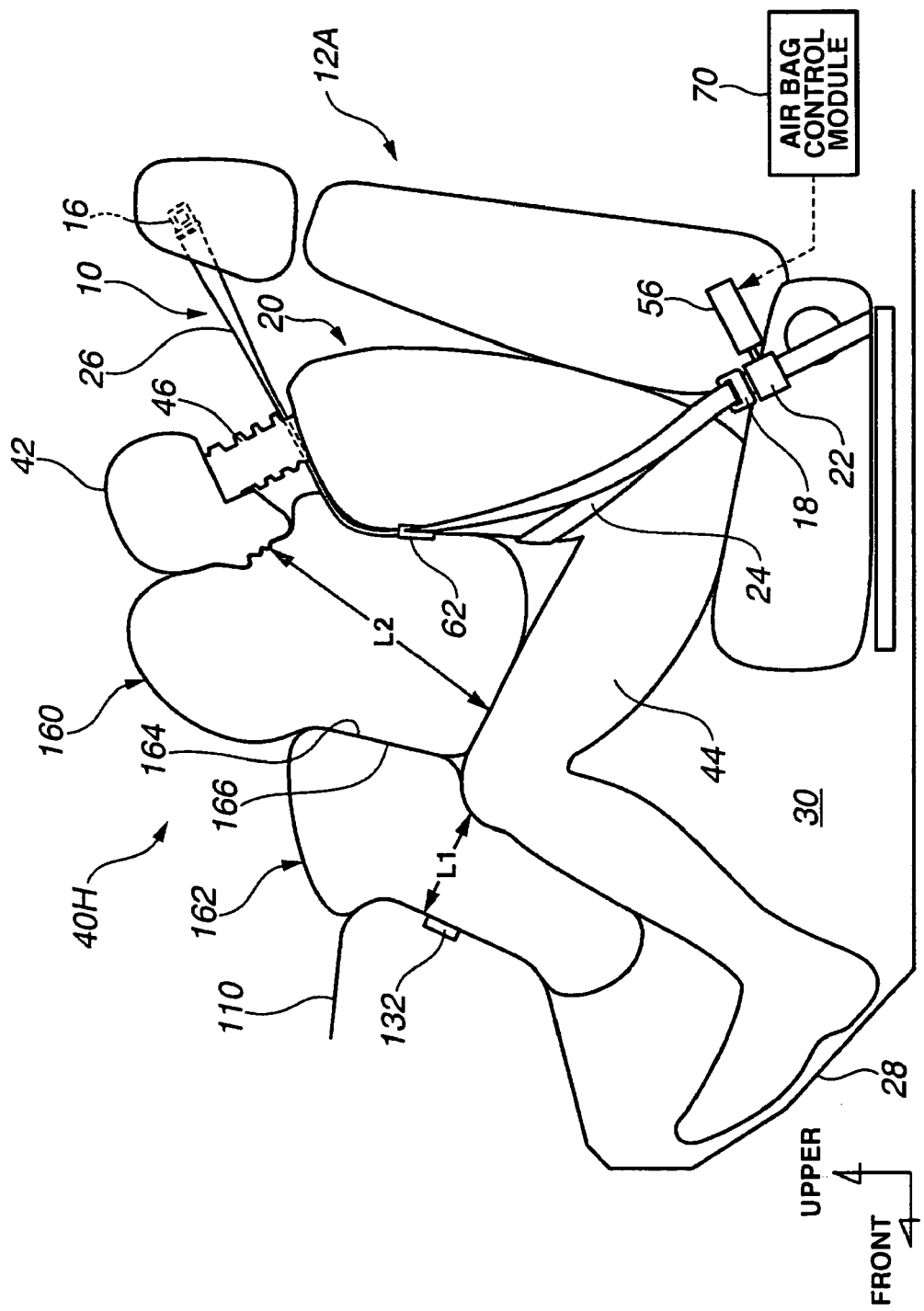
FIG. 17 shows a tenth embodiment of a passenger-side vehicle occupant restraint system in a motor vehicle, according to the present invention.
Figure 18:
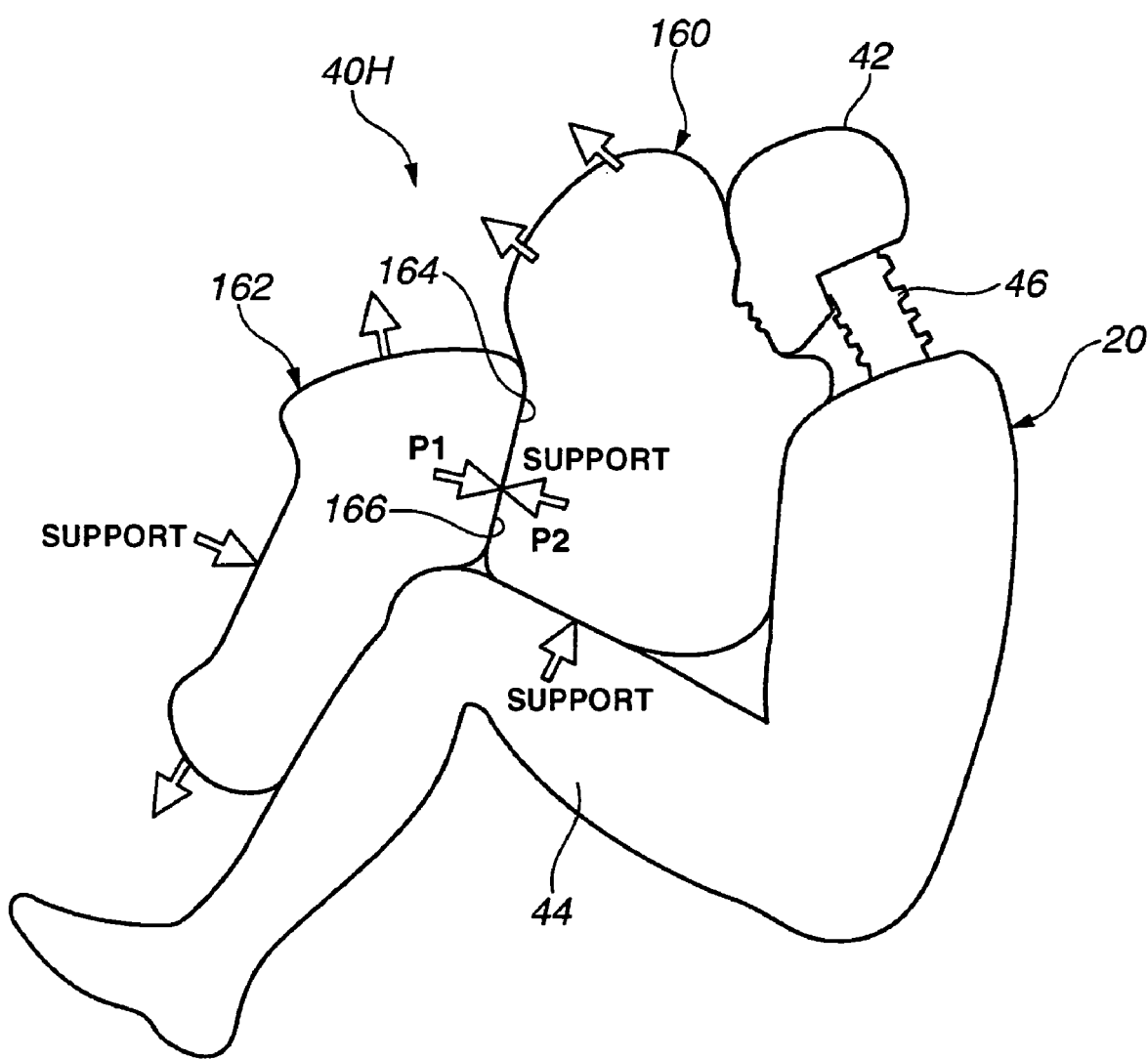
FIG. 18 shows how the presently filed embodiment of FIG. 17 works during a vehicle frontal collision.
Figure 19:
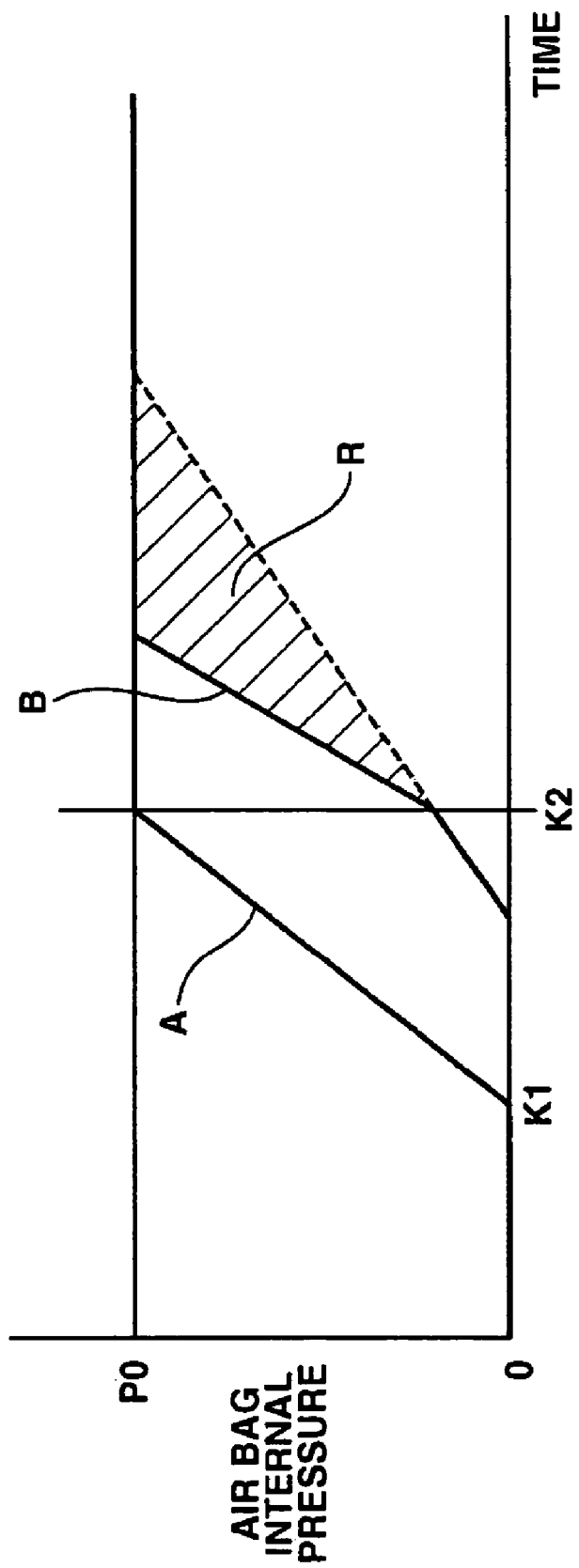
FIG. 19 shows varying of internal pressure within a leg protection air bag of the presently filed embodiment of FIG. 17 with time and varying of internal pressure within a head protection air bag of the presently filed embodiment of FIG. 17 with time.

FIGS. 17 to 19 show a vehicle occupant restraint system for the passenger in a motor vehicle, which largely corresponds to the system represented in FIG. 13. The restraint system represented in FIG. 17 differs from the system shown in FIG. 13 in the use of an air bag restraint device 40H instead of the air bag restraint device 40E.

The air bag restraint device 40H includes a head protection air bag 160 and a leg protection air bag 162. The head protection air bag 160 doubles as the upper and lower air bags 48 and 52 shown in FIG. 1 or 48A and 52A in FIG. 5. The leg protection air bag 162 was accommodated in a dashboard 110 in a motor vehicle having a front passenger seat 12A. There is indicated a gas generator or inflator 132 that is activated in response to a command signal from an air bag control module 70. By means of the inflator 132, the leg protection air bag 160 has inflated and deployed between the dashboard 110 and the legs of a vehicle occupant 20. The vehicle occupant 20 is restrained to the seat 12A by means of a three-point seat belt restraint device 10. The head protection air bag 160 was accommodated in a shoulder belt portion 26. The head protection air bag 160 has inflated by means of a gas generator or inflator 56. The inflator 56 is activated in response to the command signal from the air bag control module 70. The head protection air bag 160 has deployed out of the shoulder belt portion 26 between the head 42 of the vehicle occupant 20 and the femoral regions 44. The leg protection air bag 162 has deployed into pressing contact with the head protection air bag 160 that is in the process of deployment.

In the embodiment of FIG. 17, the air bag control module 70 can determine that a frontal collision of the vehicle is imminent and generate the command signals immediately before the vehicle frontal collision. As the leg and head protection air bags 162 and 160 start inflating in response to the respective command signals, the leg and head protection air bags 162 and 160 will complete their deployment at an early stage during the vehicle frontal collision.

According to a method aspect of the embodiment of FIG. 17, a vehicle occupant restraint method comprises deploying the leg protection air bag 162 between the legs of the vehicle occupant 20 and a portion of the dashboard 110 in front of and facing the legs during a vehicle frontal collision; deploying the head protection air bag 160 out of the seat belt restraint device 10 between the head 42 and the femoral regions 44 of the vehicle occupant 20; and bringing the leg protection air bag 162 into pressing contact with the head protection air bag 160 during the process of deployment of the head protection air bag 160.

The leg protection air bag 162 has deployed in a direction toward the rear in the motor vehicle, and the head protection air bag 160 has deployed in a direction toward the front in the motor vehicle.

The leg protection air bag 162 has deployed over the knee area of the vehicle occupant 20 in the direction toward the rear into pressing contact with the head protection air bag 160 to accelerate deployment of same by transmitting a force from the leg protection air bag 162 to the head protection air bag 160. Specifically, the leg protection air bag 162 has deployed to bring its upper rear end wall 164 into pressing contact with a lower front wall portion 166 of the head protection air bag 160 that is in the process of deployment. The leg protection air bag 162 is of the volume and configuration and the head protection air bag 160 is of the volume and configuration, so that the upper rear end wall 164 in pressing contact with the lower front wall portion 166 may produce an interface wide enough to provide a desired transmission of force in magnitude and time from the leg protection air bag 162 to the head protection air bag 160. Examples of the leg protection air bag 162 will be later described in connection with FIGS. 21 to 25.

In case of a vehicle frontal collision, the inflators 56 and 132 are activated in response to the command signal from the air bag control module 70. Gas generated by the inflators 56 and 132 inflate the leg and head protection air bags 162 and 160.

In the normal position, the vehicle occupant 20 within the front passenger seat 12A has one's legs disposed in a foot well limited by a lower end of the dashboard 110 with the knee area opposed to the dashboard 110. During a vehicle frontal collision, the vehicle occupant 20 has taken a position as illustrated in FIG. 17 due to the inertia. In the illustrated position, the vehicle occupant 20 bends forward with one's legs bent. With the illustrated position, the vehicle occupant 20 tends to move forward in the motor vehicle.

In the illustrated position of FIG. 17, the distance L1 to the dashboard 110 from the legs becomes less than the distance L2 between the head 42 and the femoral regions 44, so that the leg protection air bag 162 is compressed harder than the head protection air bag 160 during the process of their deployment. This causes a quick deployment of the leg protection air bag 162 into pressing contact with the head protection air bag 160, which is in the process of its deployment, and a quick pressure build-up within the leg protection air bag 162 well before a pressure build-up within the head protection air bag 160.

Referring also to FIG. 18, the leg protection air bag 162 has developed with its internal pressure increased due to the quick pressure build-up, while the head protection air bag 160 is in the process of deployment with its internal pressure low. The developed leg protection air bag 162 presses the head protection air bag 160 through the interface between the upper rear end wall 164 and the lower front wall portion 166. In illustration of FIG. 18, a force derived from an internal pressure P1 within the leg protection air bag 162 acts on the head protection air bag 160 and it is opposed by a reaction derived from an internal pressure P2 within the head protection air bag 160. The internal pressure P2 increases to a predetermined pressure value P0 at a rate that increases due to the force acting on the head protection air bag 160. This provides for an advance in timing at which the internal pressure P2 as high as the predetermined pressure value P0 develops. The head protection air bag 160 can catch and restrain the head 42 at the advanced timing during a vehicle frontal collision, so that the kinetic energy of the head 42 may be absorbed gradually to alleviate the impact on the head 42.

FIG. 19 illustrates varying of internal pressure within the leg protection air bag 162 with elapsed time from the moment at which a command signal is provided by the air bag control module 70 and varying of internal pressure within the head protection air bag 160 with the elapsed time. In FIG. 19, at the moment 0, the command signal is provided to the inflator 132 for the leg protection air bag 162 and also to the inflator 56 for the head protection air bag 160. One may consider that the both air bags 162 and 160 start inflating at this moment 0. After the moment 0, the leg protection air bag 162 expands without any restriction so that its internal pressure is almost at zero level, and the head protection air bag 160 expands without any restriction so that its internal pressure is almost at zero level. The moment K1 represents the beginning of a stage of deployment in which the expansion of the leg protection air bag 162 restricted because the legs of the vehicle occupant 20 act on the leg protection air bag 162. After entering this stage, the internal pressure increases at a quick rate (speed) as indicated by the variation characteristic A. In the illustrated example, immediately before the moment K2 but after the moment K1, the expansion of the head protection air bag 162 is limited by contact with the femoral regions 44 of the vehicle occupant 20 and the internal pressure within the head protection air bag 160 starts increasing at a rate (speed) slower than the rate at which the internal pressure within the head protection air bag 160 has increased. At the moment K2, the upper rear end wall 164 of the leg protection air bag 162 is brought into pressing contact with the lower front wall portion 166 of the head protection air bag 160 so that the internal pressure within the leg protection air bag 162 stops increasing further than the predetermined pressure value P0. At or after the moment K2, the volume of the head protection air bag 160 reduces due to the force acting on the head protection air bag 160 through the interface between the upper rear end wall 164 and the lower front wall portion 166. This causes a shift in the rate (speed) at which the internal pressure within the head protection air bag 160 increases. At or after the moment K2, the internal pressure within the head protection air bag 160 increases at a rate (speed) quicker than before as indicated by the pressure characteristic B. Upon elapse of a short time after the moment K2, the internal pressure within the head protection air bag 160 reaches the predetermined pressure value P0 and stops increasing further. In FIG. 19, the pressure characteristic B and a broken straight line define therebetween a shadowed delta R. The broken straight line illustrates varying of the internal pressure within the head protection air bag 160, which would take place if the leg protection air bag 162 were out of pressing contact with the head protection air bag 160 during the process of deployment. An angle of the shadowed delta R may be adjusted by varying an interface between the upper rear end wall 164 of the leg protection air bag 162 and the lower front wall portion 166 of the head protection air bag 160. In other words, it is appreciated as an advantage that varying the interface results in adjustment of an advance in timing at which the internal pressure within the head protection air bag 160 reaches the predetermined pressure value P0 without increasing the quantity of volume of gas supplied to the head protection air bag 160.

In the embodiment of FIG. 17, the head protection air bag 160 directly rests against the femoral regions 44 of the vehicle occupant 20 in the deployed condition, so that the head protection air bag 160 indirectly supports the head 42 against the femoral regions 44 of the vehicle occupant 20.

In the embodiment of FIG. 17, the air bag restraint device 40H brings the leg protection air bag 162 into cooperation with the head protection air bag 160 to prevent the waist of the vehicle occupant 20 from moving forwardly out of the restraint of the lap belt portion 24 by pressing the legs from forward at the knee area and from above at the femoral regions 44.

In the embodiment of FIG. 17, the leg protection air bag 162 and the head protection air bag 160 start inflating upon the air bag control module 70 determining that a vehicle frontal collision is imminent. This allows a further advancement of the completion timing of deployment of the leg and head protection air bags 162 and 160.

Eleventh Embodiment

Figure 20:
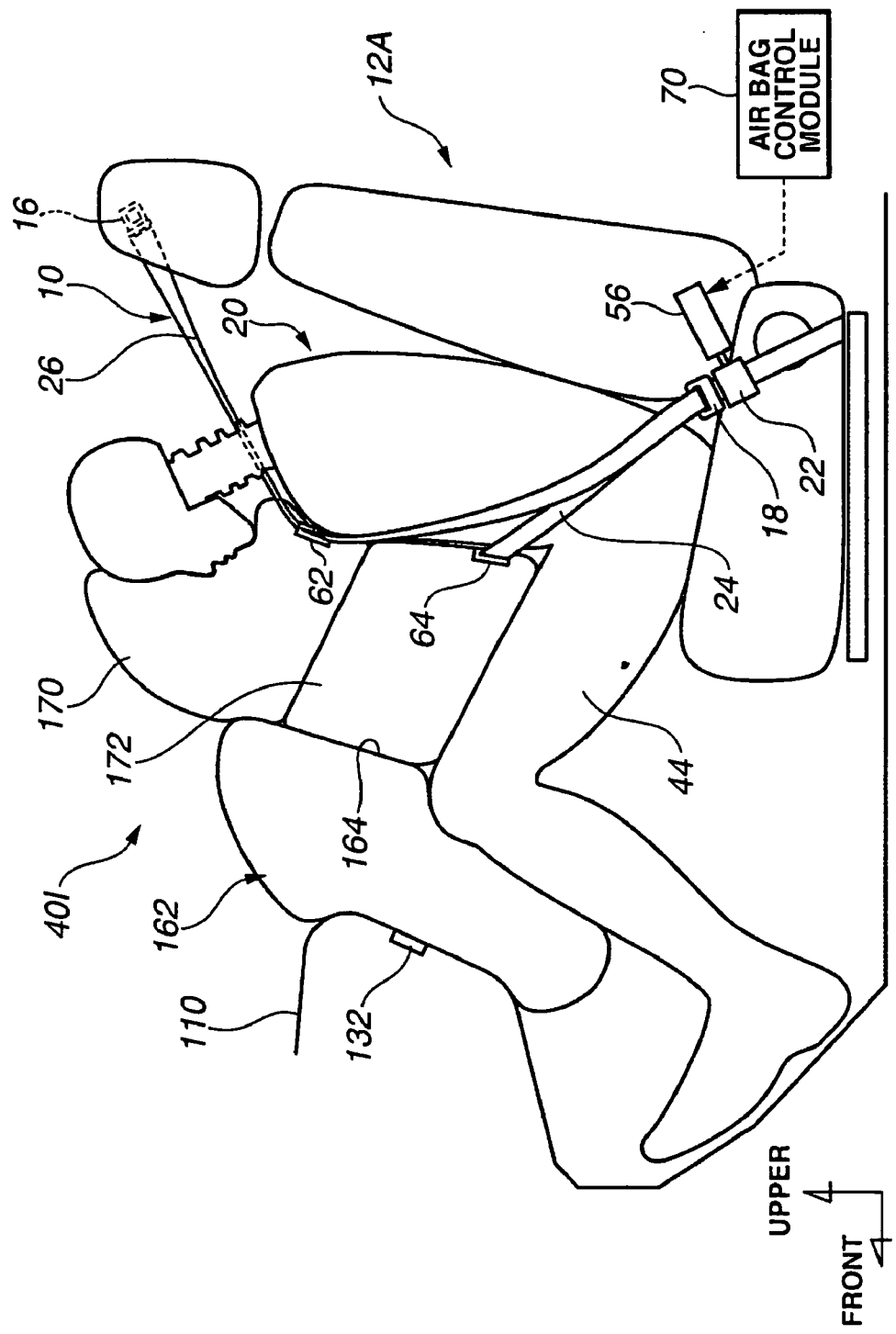
FIG. 20 shows an eleventh embodiment of a passenger-side vehicle occupant restraint system in a motor vehicle, according to the present invention.

A vehicle occupant restraint system shown in FIG. 20 differs from the system represented in FIG. 17 in that an upper or head protection air bag 170 and a lower air bag 172 of an air bag restraint device 40I were accommodated in a shoulder belt portion 26 and a lap belt portion 26, respectively, in the same manner as the air bag restraint device 40 represented in FIG. 1. A leg protection air bag 162 has deployed over the knee area of a vehicle occupant 20 in the direction toward the rear into pressing contact with the upper or head protection air bag 170 and the lower air bag 172. Specifically, the leg protection air bag 162 has deployed to bring its upper rear end wall 164 into pressing contact with a lower front wall portion of the head protection air bag 170 and a front wall portion of the lower air bag 172, which are in the process of deployment.

Twelfth Embodiment

Figure 21:
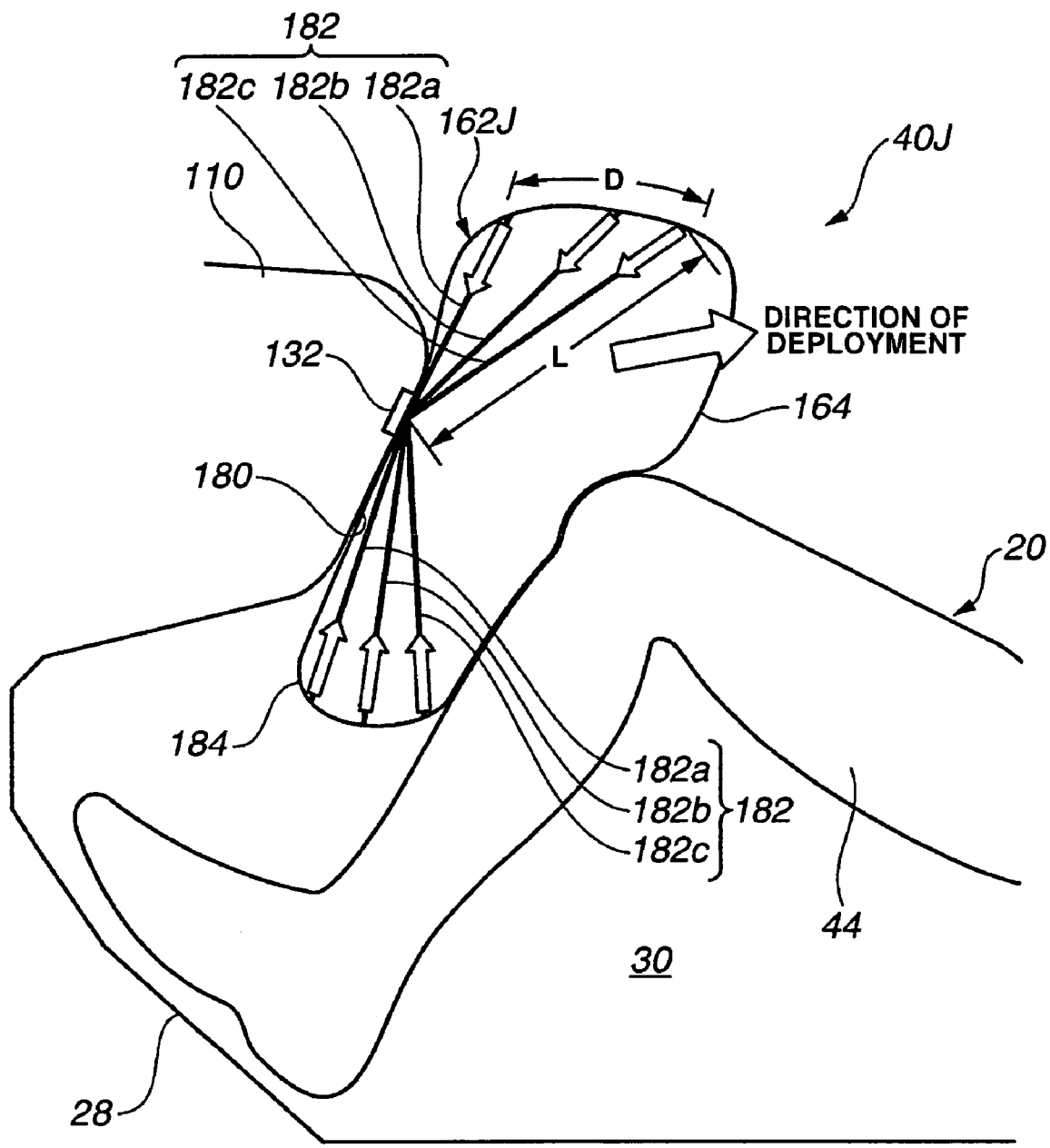
FIG. 21 shows a twelfth embodiment of a passenger-side vehicle occupant restraint system in a motor vehicle showing a first variation of a leg protection air bag in a deployed condition, according to the present invention.

A leg protection air bag 162J of an air bag restraint device 40J shown in FIG. 21 may be used in the place of the leg protection air bag 162 in the system represented in FIG. 17 or in the system represented in FIG. 20.

In this embodiment, as shown in FIG. 21, the leg protection air bag 162J has deployed out of a front face 180 of a dashboard 110. The front face 180 is opposed to the legs of a vehicle occupant 20. The leg protection air bag 162J, when inflated, has a chamber and wall means defining the chamber. The wall means includes an outer peripheral wall 184 and an upper rear end wall 164. Within the chamber, there is a restrictor 182 in the form of a plurality of straps made of flexible and non-stretchable material, only three of which are shown at 182a, 182b and 182c. As illustrated, the restrictor 182 has extended fully to pull the outer peripheral wall 184 inward thereby preventing the volume of the chamber from increasing in directions normal to the outer peripheral wall 184 in the process of deployment. However, the restrictor 182 allows the volume of the chamber from increasing in such a predetermined direction of deployment, indicated by an arrow, as to bring the upper rear end wall 164 into pressing contact with the front wall portion 166 of the head protection air bag 160 (see FIG. 17) or the front wall portions of the upper or head protection air bag 170 and lower air bag 172 (see FIG. 20).

Each of the straps 182a, 182b and 182c has one and the other end. At portion intermediate to the strap ends, each of the straps 182a, 182b and 182c is fixedly mounted to a common fixture disposed near an inlet from which gas enters the chamber to inflate the leg protection air bag 162J. When fully extended, each of the straps 182a, 182b and 182c extend in two different directions over predetermined respective lengths, one length being represented at L, to a pair of anchor points, which pair is disposed within one of different cross sectional planes lying within a space, represented at D, between the front face 180 of the dashboard 110 and the legs of the vehicle occupant 20.

In the embodiment of FIG. 21, the restrictor 182 may use different number of straps without impairing its function.

Thirteenth Embodiment

Figure 22:
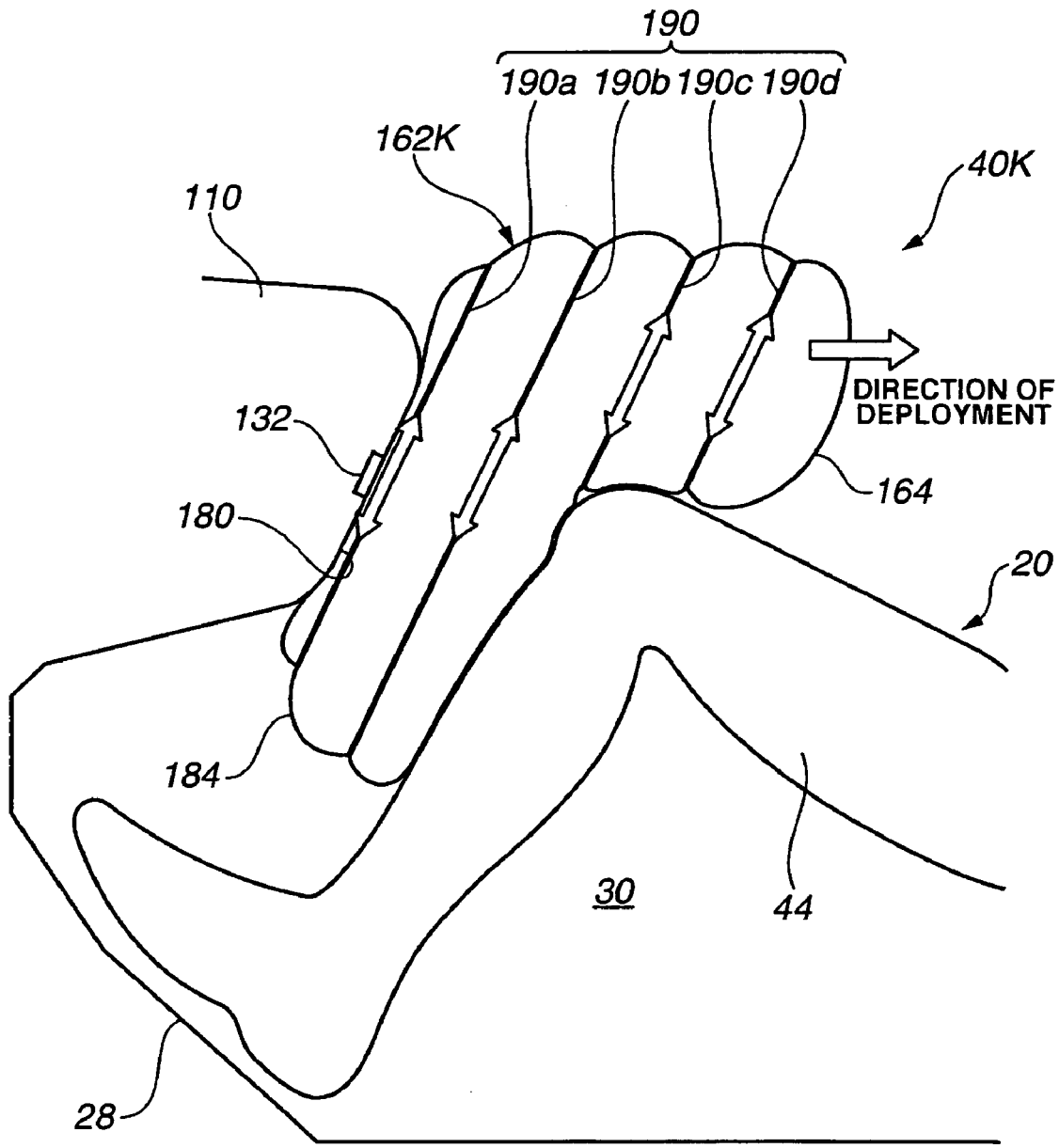
FIG. 22 shows a thirteenth embodiment of a passenger-side vehicle occupant restraint system in a motor vehicle showing a second variation of a leg protection air bag in a deployed condition, according to the present invention.

A leg protection air bag 162K of an air bag restraint device 40K shown in FIG. 22 may be used in the place of the leg protection air bag 162 in the system represented in FIG. 17 or in the system represented in FIG. 20.

In this embodiment, as shown in FIG. 22, the leg protection air bag 162K has deployed out of a front face 180 of a dashboard 110. The front face 180 is opposed to the legs of a vehicle occupant 20. The leg protection air bag 162K, when inflated, has a chamber and wall means defining the chamber. The wall means includes an outer peripheral wall 184 and an upper rear end wall 164. Within the chamber, there is a restrictor 190 in the form of a plurality of rings, only four of which are shown at 190a, 190b, 190c and 190d. As illustrated, the restrictor 190 has extended fully to prevent the volume of the chamber from increasing in directions normal to the outer peripheral wall 184 in the process of deployment. However, the restrictor 190 allows the volume of the chamber from increasing in such a predetermined direction of deployment, indicated by an arrow, as to bring the upper rear end wall 164 into pressing contact with the front wall portion 166 of the head protection air bag 160 (see FIG. 17) or the front wall portions of the upper or head protection air bag 170 and lower air bag 172 (see FIG. 20).

Each of the rings 190a, 190b, 190c and 190d is formed from a tape made of a flexible and non-stretchable material. Each of the rings 190a, 190b, 190c and 190d is mounted to the outer peripheral wall 184 by attaching the tape to the outer peripheral wall 184 from the inside with the tape ends connected to each other. When fully extended, the rings 190a and 190b are disposed within a space between the front face 180 of the dashboard 110 and the legs of the vehicle occupant 20 and the other two rings 190c and 190d of the reduced diameter are disposed above the knee area of the vehicle occupant 20.

In the embodiment of FIG. 22, the restrictor 190 may use different number of rings from four without impairing its function.

Fourteenth Embodiment

Figure 23:
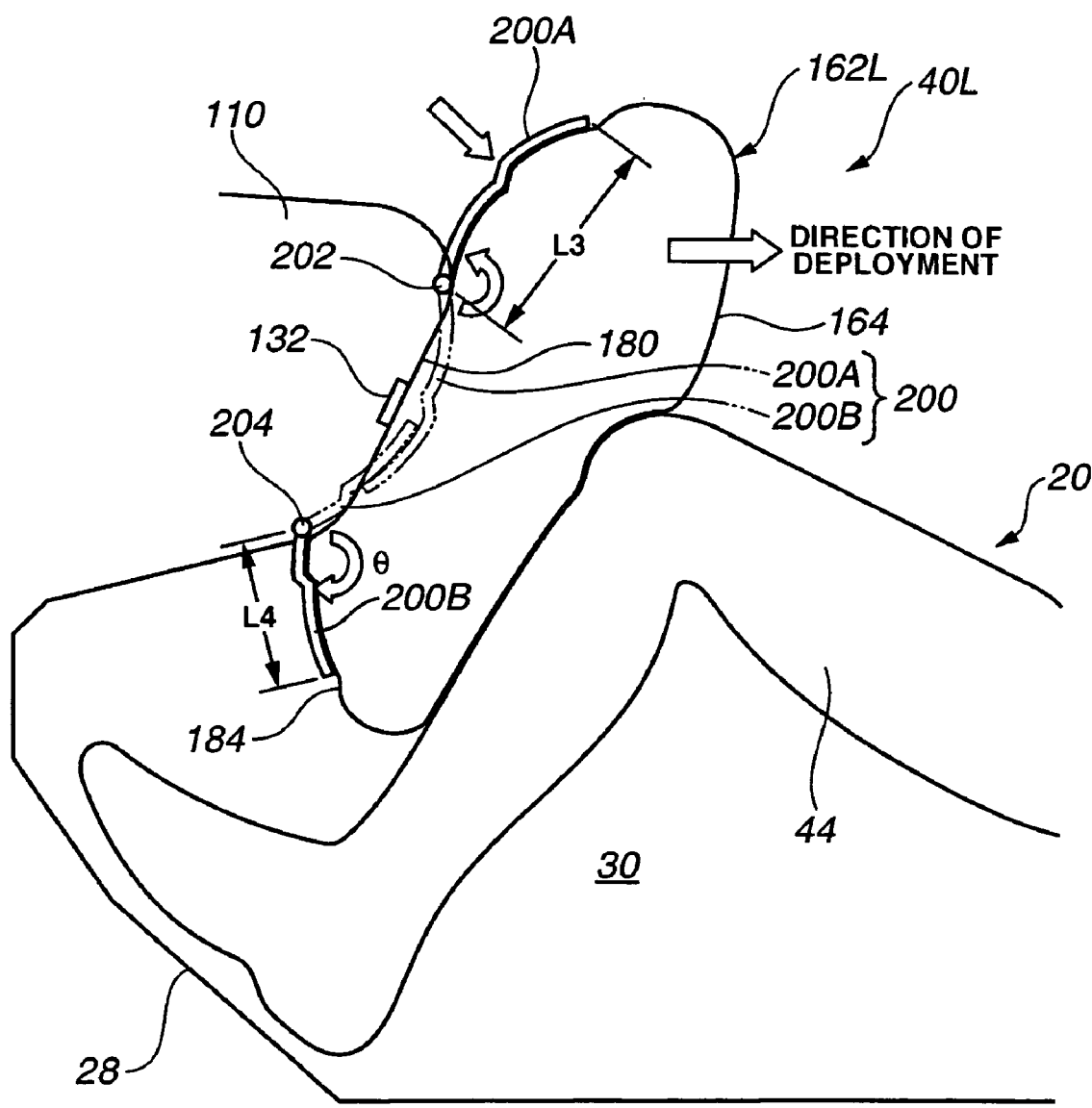
FIG. 23 shows a fourteenth embodiment of a passenger-side vehicle occupant restraint system in a motor vehicle showing a third variation of a leg protection air bag in a deployed condition, according to the present invention.

A leg protection air bag 162L of an air bag restraint device 40L shown in FIG. 23 may be used in the place of the leg protection air bag 162 in the system represented in FIG. 17 or in the system represented in FIG. 20.

In this embodiment, as shown in FIG. 23, the leg protection air bag 162L has deployed out of a front face 180 of a dashboard 110 by opening air bag storage door 200. The front face 180 is opposed to the legs of a vehicle occupant 20. The leg protection air bag 162L, when inflated, has a chamber and wall means defining the chamber. The wall means includes an outer peripheral wall 184 and an upper rear end wall 164.

In the embodiment of FIG. 23, the air bag storage door 200 performs the function of a restrictor, which otherwise require the provision of a separate restrictor, such as, restrictors 182 (see FIG. 21) and 190 (see FIG. 22).

The air bag storage door 200 is provided on a front face 180 of a dashboard to cover a deployment fixture 132 within the dashboard 110. The door 200 includes an upper door element 200A and a lower door element 200B. The upper and lower door elements 200A and 200B open on upper and lower hinges 202 and 204. The upper hinge 202 is disposed on an upper portion of the front face 180 of the dashboard 110, while the lower hinge 204 is disposed on a lower portion of the front face 180 of the dashboard 110.

The upper door element 200A has a curved configuration protruded rearward when closed as indicated by the phantom line. The lower door element 200B has a curved configuration protruded rearward when closed as indicated by the phantom line.

The upper and lower door elements 200A and 200B have sufficiently wide dimensions L3 and L4, respectively, to restrict, when open, an outer peripheral wall 184.

The upper and lower door elements 200A and 200B open on the hinges 202 and 204 to the fully drawn illustrated positions. The upper door element 200A abuts an upper edge area of the front face 180 of the dashboard 110 and stop opening further, thereby preventing expansion of the leg protection air bag 162L in directions normal to the surface of the outer peripheral wall 184. The lower door element 200B is arranged to open through a predetermined angle θ and stop opening further, thereby preventing expansion of the leg protection air bag 162L in directions normal to the surface of the outer peripheral wall 184.

In this embodiment, as shown in FIG. 23, the leg protection air bag 162L has deployed out of the dashboard 110 by push opening the upper and lower door elements 200A and 200B. The leg protection air bag 162L, when inflated, has a chamber and wall means defining the chamber. The wall means includes the outer peripheral wall 184 and an upper rear end wall 164. The upper and lower door elements 200A and 200B are locked to the illustrated open positions, thereby preventing the volume of the chamber from increasing in directions normal to the outer peripheral wall 184 in the process of deployment. However, they allow the volume of the chamber from increasing in such a predetermined direction of deployment, indicated by an arrow, as to bring the upper rear end wall 164 into pressing contact with the front wall portion 166 of the head protection air bag 160 (see FIG. 17) or the front wall portions of the upper or head protection air bag 170 and lower air bag 172 (see FIG. 20).

In the embodiment of FIG. 23, the air bag storage door 200 performs the function of a restrictor, which otherwise requires the provision of a separate restrictor.

Fifteenth Embodiment

Figure 24:
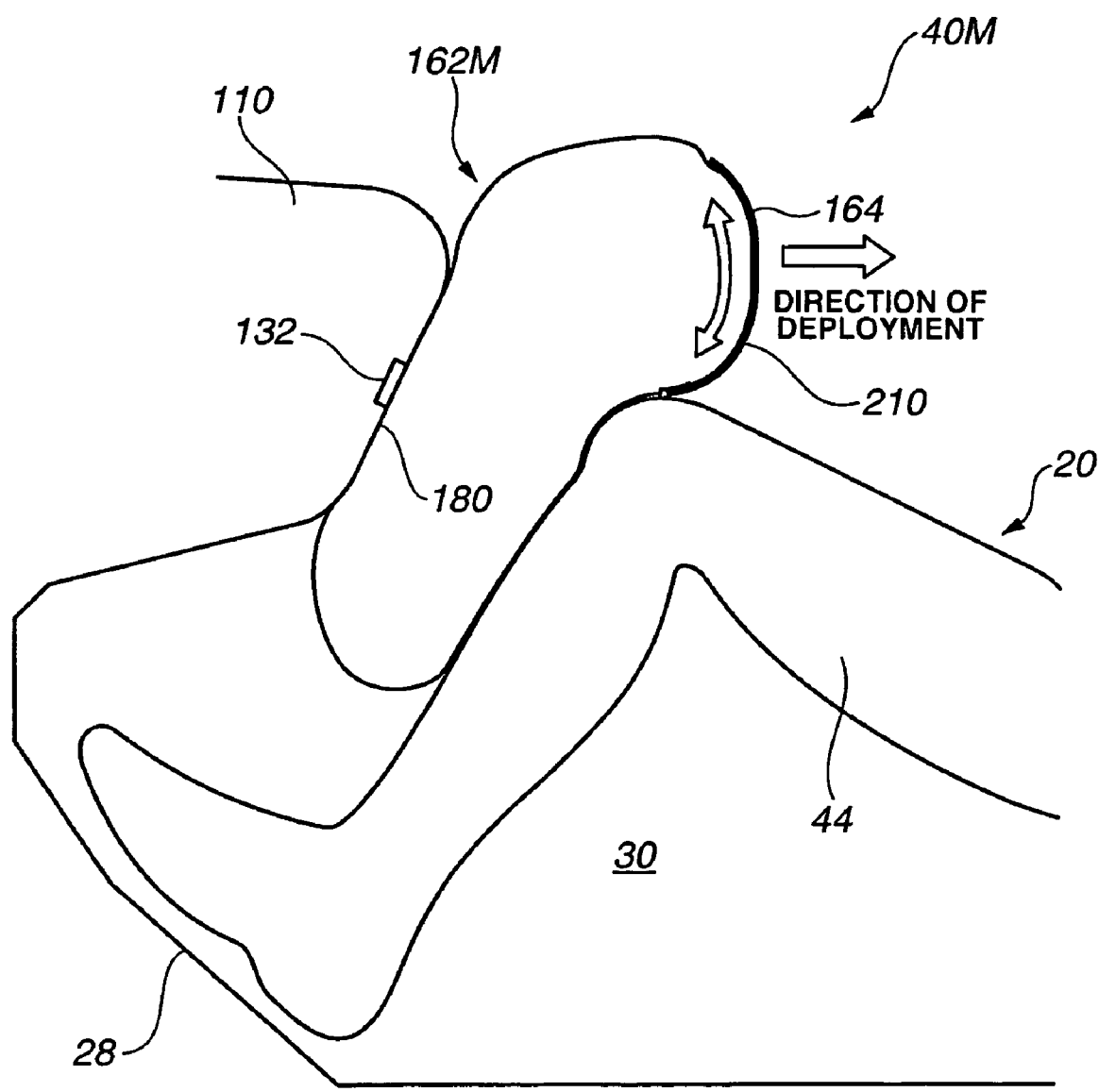
FIG. 24 shows a fifteenth embodiment of a passenger-side vehicle occupant restraint system in a motor vehicle showing a fourth variation of a leg protection air bag in a deployed condition, according to the present invention.

A leg protection air bag 162M of an air bag restraint device 40M shown in FIG. 24 may be used in the place of the leg protection air bag 162 in the system represented in FIG. 17 or in the system represented in FIG. 20.

In this embodiment, as shown in FIG. 24, the leg protection air bag 162M has deployed out of a front face 180 of a dashboard 110. The front face 180 is opposed to the legs of a vehicle occupant 20. The leg protection air bag 162M, when inflated, has a chamber and wall means defining the chamber. The wall means includes an outer peripheral wall and an upper rear end wall 164.

In the embodiment of FIG. 24, the leg protection air bag 162M is made of a flexible and non-stretchable sheet. The leg protection air bag 162M is formed with an opening at an area where the upper rear end wall 164 should be disposed. This opening is sealed and covered with a stretchable sheet 210. This structure of the leg protection air bag 162M including the stretchable sheet 210 performs the function of a restrictor. This structure prevents the volume of the chamber from increasing in directions normal to the outer peripheral wall except the opening sealed and covered by the stretchable sheet 210 in the process of deployment. However, the stretchable sheet 210 allows the volume of the chamber from increasing in such a predetermined direction of deployment, indicated by an arrow, as to bring the upper rear end wall 164 into pressing contact with the front wall portion 166 of the head protection air bag 160 (see FIG. 17) or the front wall portions of the upper or head protection air bag 170 and lower air bag 172 (see FIG. 20).

Sixteenth Embodiment

Figure 25:
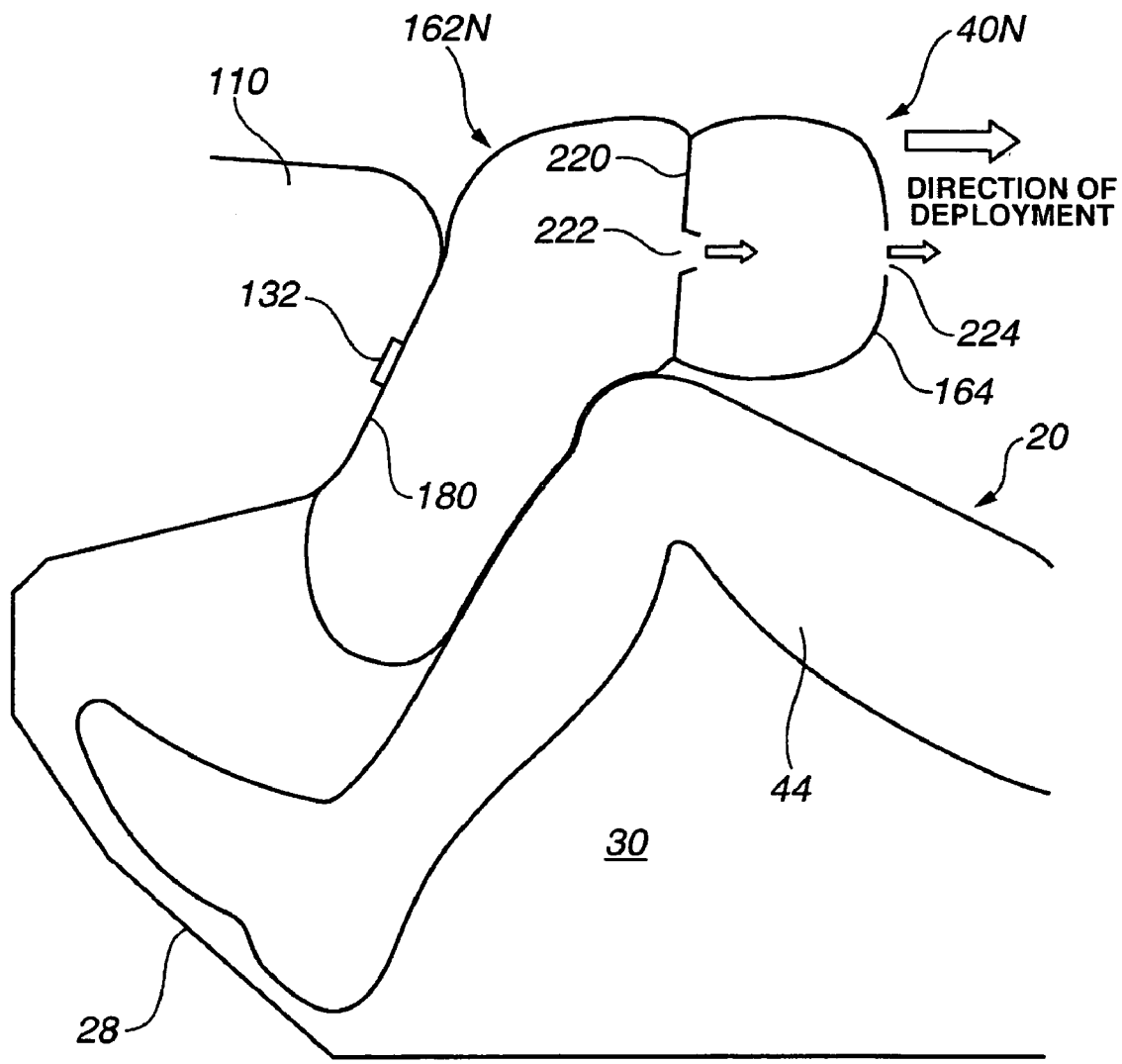
FIG. 25 shows a sixteenth embodiment of a passenger-side vehicle occupant restraint system in a motor vehicle showing a fifth variation of a leg protection air bag in a deployed condition, according to the present invention.

A leg protection air bag 162N of an air bag restraint device 40N shown in FIG. 25 may be used in the place of the leg protection air bag 162 in the system represented in FIG. 17 or in the system represented in FIG. 20.

In this embodiment, as shown in FIG. 25, the leg protection air bag 162N has deployed out of a front face 180 of a dashboard 110. The front face 180 is opposed to the legs of a vehicle occupant 20. The leg protection air bag 162N, when inflated, has wall means including an outer peripheral wall and an upper rear end wall 164. A partition 220 is provided to divide the interior into a first chamber disposed between the front face 180 and the legs of the vehicle occupant 20 and a second or leading chamber near the upper rear end wall 164. The partition 220 is provided with a one-way valve 222. The one-way valve 222 opens to allow one-way flow of gas into the leading chamber. The upper rear end wall 164 is formed with a vent hole 224. This vent hole 224 is arranged such that it is closed when the upper rear end wall 164 comes into contact with the front wall portion 166 of the head protection air bag 160 (see FIG. 17) or the front wall portions of the upper or head protection air bag 170 and lower air bag 172 (see FIG. 20). This structure of the one-way valve 222 and the vent hole 224 perform the function of a restrictor.

Because of the provision of the one-way valve 222 within the partition 220 defining the leading chamber behind the upper rear end wall 164, the leg protection air bag 162N deploys in the predetermined direction of deployment. The vent hole 224 is closed after the upper rear end wall 164 has come into contact with the front wall portion 166 of the head protection air bag 160 (see FIG. 17) or the front wall portions of the upper or head protection air bag 170 and lower air bag 172 (see FIG. 20). As the internal pressure increases quickly after the vent hole 224 has been closed, the upper rear end wall 164 is pressed into contact with the head protection air bag quickly.

In the preceding description of the embodiments shown in FIGS. 17 to 25, the seat belt restraint device 10 has been described taking a three-point seat belt device as an example. The seat belt restraint device 10 may take the form of a four-point seat belt device. In each of these embodiments, the leg protection air bag 162 was accommodated within and has deployed out of the dashboard 110. The leg protection air bag 162 may be accommodated at any suitable portion in a motor vehicle in front of the legs of a vehicle occupant 20.

The entire content of a Patent Application No. TOKUGAN 2004-232428 with a filing date of Aug. 9, 2004 in Japan, the entire content of a Patent Application No. TOKUGAN 2004-232433 with a filing date of Aug. 9, 2004 in Japan and the entire content of a Patent Application No. TOKUGAN 2004-262168 with a filing date of Sep. 9, 2004 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle occupant restraint system, comprising:
   a seat belt restraint device including a shoulder belt portion and a lap belt portion; and
   an air bag restraint apparatus including a first deploying portion deploying between a location of a vehicle occupant and a portion of a vehicle in the vehicle, and a second deploying portion deploying in a manner related to the first deploying portion, with at least the first deploying portion deploying out from the shoulder belt portion and the shoulder belt portion and the lap belt portion being located closer to the location of the vehicle occupant than the first deploying portion and the second deploying portion, the second deploying portion providing a support for the first deploying portion to receive at least a part of a load acting on the first deploying portion from a location of a head of the vehicle occupant, wherein the first deploying portion and the second deploying portion are arranged in a vertical direction, and the second deploying portion is adapted to be in contact with femoral regions of the location of the vehicle occupant during deployment of the second deploying portion.

2. The vehicle occupant restraint system as claimed in claim 1, wherein the air bag restraint apparatus includes at least one air bag adapted to deploy between the location of the head of the vehicle occupant and the femoral regions of the location of the vehicle occupant thereby supporting a load acting on the femoral regions.

3. The vehicle occupant restraint system as claimed in claim 2, wherein the air bag restraint apparatus includes a plurality of air bags arranged in a vertical direction for transmission of the load acting on the femoral regions therealong.

4. The vehicle occupant restraint system as claimed in claim 3, wherein a controller controls deployment of the plurality of air bags in response to a measure of physique of a vehicle occupant.

5. The vehicle occupant restraint system as claimed in claim 2, wherein the air bag restraint apparatus includes:
an upper air bag in a proximity of the location of the head of the vehicle occupant; and
a lower air bag between the upper air bag and the femoral regions to support a load acting on the upper air bag and the load acting from the femoral regions of the location of the vehicle occupant.

6. The vehicle occupant restraint system as claimed in claim 5, wherein the lower air bag is integral with the upper air bag and separated by a partition.

7. The vehicle occupant restraint system as claimed in claim 2, wherein the at least one air bag has two end portions spaced in the vertical direction, and is deformable more at one of the two end portions than at the other.

8. The vehicle occupant restraint system as claimed in claim 2, wherein the vehicle occupant restraint system is adapted such that at least one air bag starts deploying between the location of the head of the vehicle occupant and the femoral regions of the location of the vehicle occupant upon a determination that a vehicle frontal collision is imminent.

9. The vehicle occupant restraint system as claimed in claim 1, wherein the first deploying portion is adapted to be inflated between the location of the vehicle occupant and a portion of the vehicle, in the vehicle, in front of the location of the vehicle occupant to be compressed therebetween to cause an increase in internal pressure within the first deploying portion, and wherein the second deploying portion is adapted to deploy due to the increase in the internal pressure within the first deploying portion to press against a predetermined area of the location of the vehicle occupant different from the location of the head of the vehicle occupant.

10. The vehicle occupant restraint system as claimed in claim 9, wherein the predetermined area of the location of the vehicle occupant is the femoral regions of the location of the vehicle occupant.

11. The vehicle occupant restraint system as claimed in claim 9, wherein the portion of the vehicle in the vehicle in front of the location of the vehicle occupant is a steering wheel.

12. The vehicle occupant restraint system as claimed in claim 9, wherein the portion of the vehicle, in the vehicle, in front of the location of the vehicle occupant is a dashboard.

13. The vehicle occupant restraint system as claimed in claim 9, wherein the portion of the vehicle, in the vehicle, in front of the location of the vehicle occupant is a support protruding into engagement with the first deploying portion.

14. The vehicle occupant restraint system as claimed in claim 13, wherein the support is a third air bag.

15. The vehicle occupant restraint system as claimed in claim 9, wherein the second deploying portion is separate from the first deploying portion, and wherein the air bag restraint apparatus includes a tube element through which gas is supplied from the first deploying portion to the second deploying portion.

16. The vehicle occupant restraint system as claimed in claim 9, wherein the second deploying portion is integral with the first deploying portion via a membrane which provides a supply of gas to the second deploying portion from the first deploying portion.

17. The vehicle occupant restraint system as claimed in claim 16,
wherein both the first deploying portion and the second deploying portion are adapted to be deployed out of the shoulder belt portion.

18. The vehicle occupant restraint system as claimed in claim 16,
wherein the first deploying portion and the second deploying portion are adapted to be deployed out of the shoulder belt portion and the lap belt portion, respectively.

19. The vehicle occupant restraint system as claimed in claim 1, wherein the air bag restraint apparatus further includes:
at least one air bag adapted to be deployed between the head location of the vehicle occupant and the femoral regions of the location of the vehicle occupant; and
a leg protection air bag adapted to be deployed out of a portion of the vehicle in the vehicle in front of the location of the vehicle occupant into pressing contact with the at least one air bag, thereby supporting a load acting thereon.

20. The vehicle occupant restraint system as claimed in claim 19, wherein the air bag restraint apparatus includes a plurality of air bags deploying between the location of the head of the vehicle occupant and the femoral regions of the location of the vehicle occupant while interfering with each other.

21. The vehicle occupant restraint system as claimed in claim 19, wherein the leg protection air bag includes a restrictor adapted to restrict deployment of the leg protection air bag to bring the leg protection air bag into pressing contact with the at least one air bag in the process of deployment of the at least one air bag and the leg protection air bag.

22. The vehicle occupant restraint system as claimed in claim 21, wherein the restrictor includes a plurality of straps adapted to restrict deployment of a portion-of the leg protection air bag which is not to be in contact with the at least one air bag.

23. The vehicle occupant restraint system as claimed in claim 21, wherein the restrictor includes a plurality of rings provided on an outer peripheral wall of the leg protection air bag and adapted to restrict deployment of the outer peripheral wall.

24. The vehicle occupant restraint system as claimed in claim 21, wherein the restrictor includes door elements provided on a portion of the vehicle in the vehicle in front of the location of the vehicle occupant and opening on hinges with a predetermined angle in the process of deployment of the leg protection air bag to restrict deployment of an outer peripheral wall of the leg protection air bag.

25. The vehicle occupant restraint system as claimed in claim 21, wherein the leg protection air bag is formed with a stretchable portion and a non-stretchable portion, and wherein the stretchable portion and the non-stretchable portion cooperate with each other to form the restrictor during the process of deployment of the leg protection air bag.

26. The vehicle occupant restraint system as claimed in claim 21, wherein the leg protection air bag includes an upper rear end wall, a leading chamber defined between the upper rear end wall and a partition, a one-way valve provided in the partition to allow for a flow of gas into the leading chamber, and a vent hole formed within the upper rear end wall to form the restrictor.

27. The vehicle occupant restraint system as claimed in claim 19, wherein the vehicle occupant restraint system is adapted such that the leg protection air bag and the at least one air bag start deploying upon a determination that a vehicle frontal collision is imminent.

28. The vehicle occupant restraint system, of claim 1, wherein the first deploying portion, when deployed, has a surface area that is larger than the second deploying portion, when deployed.

29. The vehicle occupant restraint system, of claim 1, wherein the first deploying portion and the second deploying portion deploy from entirely different stowage cavities in the vehicle.

30. A vehicle occupant restraint method, comprising:
deploying an air bag of an air bag restraint apparatus while defining a first deploying portion and a second deploying portion arranged in a vertical direction in case of a vehicle frontal collision, with at least the first deploying portion deploying out from a shoulder belt portion, the first deploying portion deploying between a location of a vehicle occupant and a portion in the vehicle, and the second deploying portion deploying related to the first deploying portion, and the shoulder belt portion and a lap belt portion of a seat belt restraint device being located closer to the location of the vehicle occupant than the first deploying portion and the second deploying portion; and
supporting a load acting on femoral regions of the location of the vehicle occupant via the air bag from a head location of the vehicle occupant with the first deploying portion and the second deploying portion, with the second deploying portion providing a support for the first deploying portion to receive at least a part of a load acting on the first deploying portion from the head location of the vehicle occupant.

31. The vehicle occupant restraint method as claimed in claim 30, wherein the first deploying portion deploys between the location of the vehicle occupant and a portion of the vehicle, in the vehicle, in front of the location of the vehicle occupant and is compressed therebetween to cause an increase in internal pressure of the first deploying portion, and wherein the second deploying portion deploys due to the increase in the internal pressure within the first deploying portion.

32. The vehicle occupant restraint method as claimed in claim 30, wherein the air bag restraint apparatus includes a head protection air bag protecting the head location of the vehicle occupant, and a leg protection air bag protecting legs locations of the location of the vehicle occupant, and wherein the leg protection air bag deploys into pressing contact with the head protection air bag in the process of deployment of the head protection air bag and the leg protection air bag.

33. A vehicle occupant restraint system, comprising:
a seat belt restraint device including a shoulder belt portion and a lap belt portion; and
an air bag restraint apparatus including first deploying means for deploying between a location of a vehicle occupant and a portion of the vehicle in the vehicle, and second deploying means for deploying in a manner related to the first deploying means, with at least the first deploying means deploying out from the shoulder belt portion and the shoulder belt portion and the lap belt portion being located closer to the location of the vehicle occupant than the first deploying means and the second deploying means, the second deploying means providing a support for the first deploying means to receive at least a part of a load acting on the first deploying means from a location of a head of the vehicle occupant, wherein the first deploying means and the second deploying means are arranged in a vertical direction, and the second deploying means is deployable for being in contact with femoral regions of the location of the vehicle occupant during deployment of the second deploying means.

* * * * *